(12) United States Patent
Kwon et al.

(10) Patent No.: US 10,211,652 B2
(45) Date of Patent: Feb. 19, 2019

(54) METHOD FOR CONTROLLING MULTIPLE BATTERIES AND ELECTRONIC DEVICE FOR IMPLEMENTING SAME

(71) Applicant: Samsung Electronics Co., Ltd, Gyeonggi-do (KR)

(72) Inventors: Choel-Hwi Kwon, Gyeongsangbuk-do (KR); Soon-Sang Park, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 149 days.

(21) Appl. No.: 15/199,754

(22) Filed: Jun. 30, 2016

(65) Prior Publication Data
US 2017/0005489 A1    Jan. 5, 2017

(30) Foreign Application Priority Data
Jun. 30, 2015   (KR) .................. 10-2015-0093283

(51) Int. Cl.
*H02J 7/00*    (2006.01)

(52) U.S. Cl.
CPC .......... *H02J 7/0024* (2013.01); *H02J 7/0013* (2013.01); *H02J 7/0054* (2013.01)

(58) Field of Classification Search
CPC ....... H02J 7/0024; H02J 7/0054; H02J 7/0013
See application file for complete search history.

(56) References Cited

U.S. PATENT DOCUMENTS 5,739,596 A * 4/1998 Takizawa ............... G06F 1/263
                                                          307/64
8,860,371 B2 * 10/2014 Yang ..................... H02J 7/0024
                                                         320/113
(Continued)

FOREIGN PATENT DOCUMENTS

JP        11-252711 A     9/1999
JP        2006-121874 A   5/2006
(Continued)

OTHER PUBLICATIONS

European Patent Office, "European Search Report," Application No. 16177078.9, dated Nov. 9, 2016, 8 pages, publisher EPO, Munich, Germany.
(Continued)

*Primary Examiner* — Jared Fureman
*Assistant Examiner* — Michael Warmflash

(57) ABSTRACT

An electronic device includes a housing having a first and second battery, a power management integrated circuit, a battery charging circuit, and a booster circuit. The housing also includes a first switch connected with the first battery, a second switch connected with the second battery, and a control circuit. The control circuit provides, one of a first state where the first battery is connected with the PMIC and the battery charging circuit, a second state where the first battery is connected with the booster circuit and the battery charging circuit, a third state where the first battery forms an open circuit, a fourth state where the second battery is connected with the PMIC and the battery charging circuit, a fifth state where the second battery is connected with the booster circuit and the battery charging circuit, and a sixth state where the second battery forms an open circuit.

17 Claims, 27 Drawing Sheets

(56) References Cited

U.S. PATENT DOCUMENTS

| | | | |
|---|---|---|---|
| 2009/0051223 A1 | 2/2009 | Woo | |
| 2009/0325056 A1 | 12/2009 | Greening et al. | |
| 2013/0002026 A1* | 1/2013 | Mizutani | H02J 7/0054 307/65 |
| 2014/0298197 A1* | 10/2014 | Kwon | H04L 51/00 715/752 |
| 2016/0126779 A1* | 5/2016 | Park | H02J 50/80 320/108 |

FOREIGN PATENT DOCUMENTS

| | | |
|---|---|---|
| JP | 2010-004611 A | 1/2010 |
| KR | 10-2009-0020837 | 2/2009 |
| KR | 10-2011-0004618 | 1/2011 |

OTHER PUBLICATIONS

Korean Intellectual Property Office, "International Search Report," International Application No. PCT/KR2016/007033, dated Oct. 12, 2016, 3 pages, publisher the ISA/KR, International Application Division, KIPO, Daejeon, Republic of Korea.

Communication pursuant to Article 94(3) EPC dated Nov. 23, 2017 in connection with European Patent Application No. 16 177 078.9.

\* cited by examiner

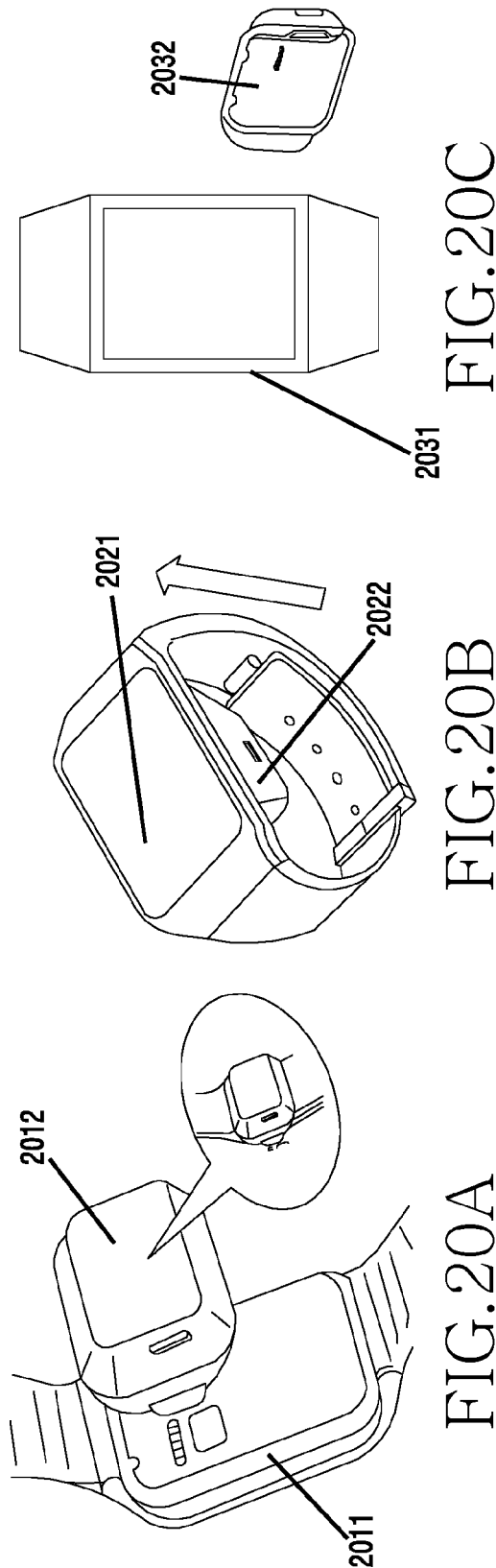

METHOD FOR CONTROLLING MULTIPLE BATTERIES AND ELECTRONIC DEVICE FOR IMPLEMENTING SAME

CROSS-REFERENCE TO RELATED APPLICATION

The present application is related to and claims the priority under 35 U.S.C. § 119(a) to Korean Application Serial No. 10-2015-0093283, which was filed in the Korean Intellectual Property Office on Jun. 30, 2015, the entire content of which is hereby incorporated by reference.

TECHNICAL FIELD

Various embodiments relate to a method for controlling multiple batteries and an electronic device for the same.

BACKGROUND

With the development of digital technology in recent years, various electronic devices capable of communicating and processing personal information while being in motion, such as a mobile communication terminal, a personal digital assistant (PDA), an electric scheduler, a smart phone, and/or a tablet personal computer (PC) have been released. Since the purpose of such an electronic device is portability, a battery, e.g., a removable battery, is used as a power supply means. A battery may output a voltage and a current proper for each electronic device.

An electronic device supports a battery or supports the form of an auxiliary battery. The electronic device may not individually monitor the quantity of electric charge of the auxiliary battery and a battery state. For example, when multiple batteries are connected to the electronic device, each state of the multiple batteries may not be monitored or managed. In addition, since the multiple batteries are connected to the electronic device in a parallel structure, the full charging capacity of the electronic device may be expanded, but each battery may not be selectively used or charged. Therefore, a transfer of electric charges among multiple batteries according to a selection by a user is impossible. Further, when a main battery that is connected in a circuit to a main power of the electronic device is disconnected from the electronic device, the power of the electronic device may be turned off. Therefore, the main battery may not be changed while the electronic device is being used.

SUMMARY

To address the above-discussed deficiencies, it is a primary object to provide a method for controlling multiple batteries and an electronic device for the same.

An electronic device according to various embodiments may include: a housing; a first battery arranged inside of the housing; a second battery arranged inside of the housing; a power management integrated circuit (PMIC) arranged inside of the housing; a battery charging circuit arranged inside of the housing; a booster circuit arranged inside of the housing; a first switch electrically connected with the first battery; a second switch electrically connected with the second battery; and a control circuit arranged inside of the housing, wherein the control circuit is configured to provide, at least using the first switch, one of a first state in which the first battery is electrically connected with the PMIC and the battery charging circuit, a second state in which the first battery is electrically connected with the booster circuit and the battery charging circuit, and a third state in which the first battery forms an open circuit, and configured to provide, at least using the second switch, one of a fourth state in which the second battery is electrically connected with the PMIC and the battery charging circuit, a fifth state in which the second battery is electrically connected with the booster circuit and the battery charging circuit, and a sixth state in which the second battery forms an open circuit.

An electronic device according to various embodiments may include: a housing; a first battery arranged inside of the housing; a second battery arranged inside of the housing; a power management integrated circuit (PMIC) arranged inside of the housing; a battery charging circuit arranged inside of the housing; a booster circuit arranged inside of the housing; a remaining battery charge measurement circuit that is electrically connected with the first battery and the second battery, and generates a signal based on the remaining battery charge of each battery; and a control circuit arranged inside of the housing, wherein the control circuit is configured to provide one of a first state in which the first battery is electrically connected with the PMIC and the battery charging circuit, a second state in which the first battery is electrically connected with the booster circuit and the battery charging circuit, and a third state in which the first battery forms an open circuit, and configured to provide one of a fourth state in which the second battery is electrically connected with the PMIC and the battery charging circuit, a fifth state in which the second battery is electrically connected with the booster circuit and the battery charging circuit, and a sixth state in which the second battery forms an open circuit.

An electronic device according to various embodiments may include: a housing; a first battery and a second battery which are mounted inside of the housing; a power management integrated circuit configured to provide power to the electronic device; a processor electrically connected with the first battery, the second battery, and the power management integrated circuit; and a memory electrically connected with the processor, wherein the memory may include instructions that allow the processor, at the time of execution, to form a network capable of providing a service for charging a third battery included in an external device with the external device, change a first voltage generated by the first battery to a second voltage that is higher than the first voltage, transmit a first power based on the second voltage to the external device, and transmit a second power based on a third voltage generated by the second battery to the power management integrated circuit, wherein a first electrical route through which the first power is transmitted and a second electrical route through which the second power is transmitted do not overlap.

An operation method of an electronic device including a first battery, a second battery, a power management integrated circuit (PMIC), a charging circuit, a booster circuit, and an open circuit, according to various embodiments may include the operations of: detecting a battery control event; controlling a first switch electrically connected to the first battery and a second switch electrically connected to the second battery, according to the battery control event; and electrically connecting the first battery and the second battery to at least one of the PMIC, the charging circuit, the booster circuit, and the open circuit, by controlling the first switch and the second switch.

According to various embodiments, an electronic device may monitor a state of each battery and selectively control a battery use or charge even when multiple batteries are connected thereto.

According to various embodiments, at least one battery among multiple batteries may be selectively used according to a user's selection or a state of a battery.

According to various embodiments, at least one battery among multiple batteries may be selectively charged according to a user's selection or a state of a battery.

According to various embodiments, an electric charge among batteries may be freely transferred by controlling switches connected to multiple batteries, respectively.

According to various embodiments, another battery or an external device connected to an electronic device may be simultaneously charged while at least one battery is used as a main power of the electronic device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 20A-20D illustrate examples related to an external battery according to various embodiments.

DETAILED DESCRIPTION

Figure 1:
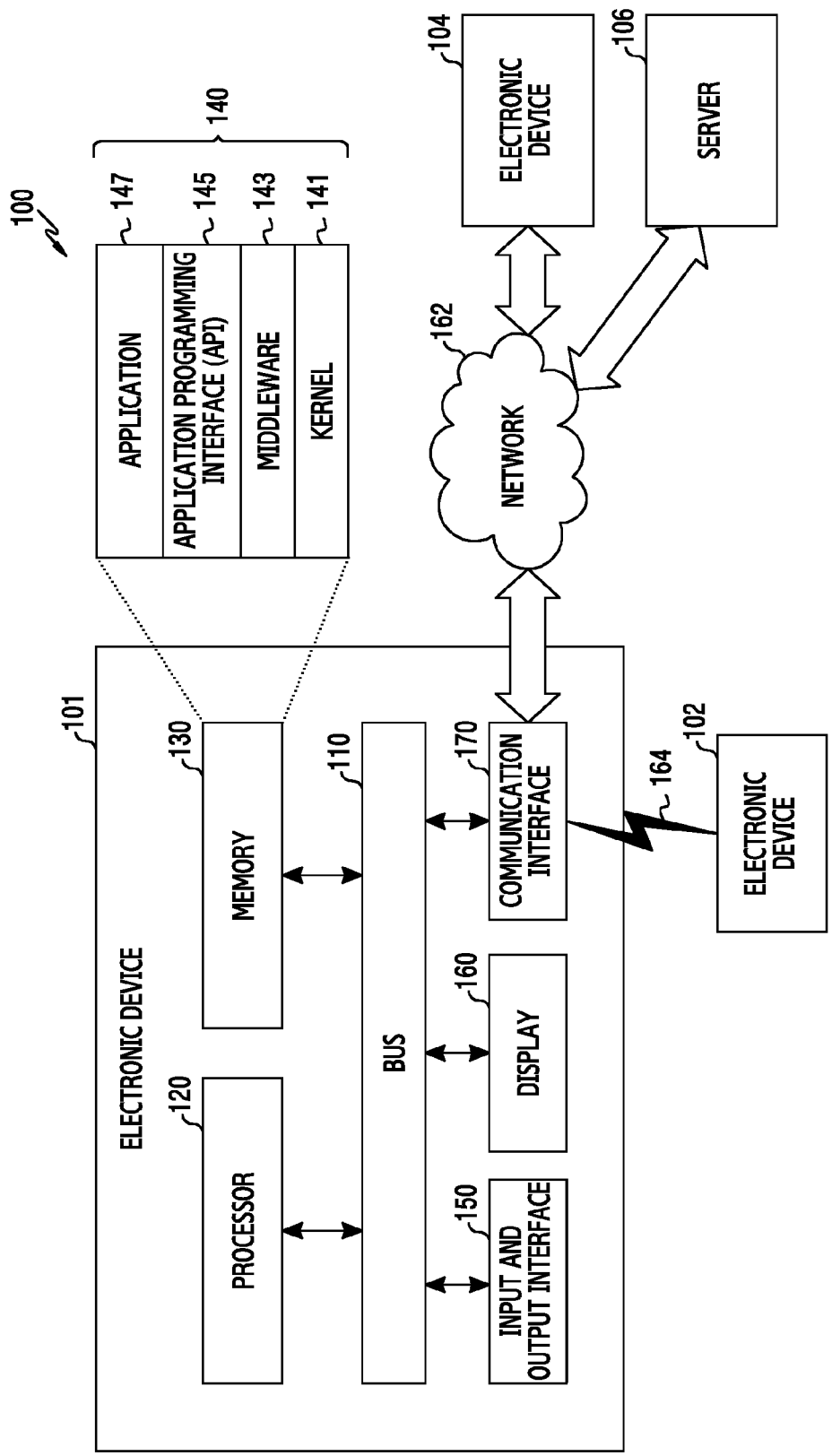
FIG. 1 illustrates an electronic device in a network environment according to various embodiments of the present disclosure.

FIGS. 1 through 20D, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B. The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV®, or Google TV®), a game console (e.g., Xbox® and PlayStation®), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 illustrates a network environment including an electronic device according to various embodiments of the present disclosure.

An electronic device 101 within a network environment 100, according to various embodiments, will be described with reference to FIG. 1. The electronic device 101 may include a bus 110, a processor 120, a memory 130, an input/output interface 150, a display 160, and a communication interface 170. According to an embodiment of the present disclosure, the electronic device 101 may omit at least one of the above components or may further include other components.

The bus 110 may include, for example, a circuit which interconnects the components 110 to 170 and delivers a communication (e.g., a control message and/or data) between the components 110 to 170.

The processor 120 may include one or more of a Central Processing Unit (CPU), an Application Processor (AP), and a Communication Processor (CP). The processor 120 may carry out, for example, calculation or data processing relating to control and/or communication of at least one other component of the electronic device 101.

The memory 130 may include a volatile memory and/or a non-volatile memory. The memory 130 may store, for example, commands or data relevant to at least one other component of the electronic device 101. According to an embodiment of the present disclosure, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (e.g., the bus 110, the processor 120, or the memory 130) used for performing an operation or function implemented in the other programs (e.g., the middleware 143, the API 145, or the application programs 147). Furthermore, the kernel 141 may provide an interface through which the middleware 143, the API 145, or the application programs 147 may access the individual components of the electronic device 101 to control or manage the system resources.

The middleware 143, for example, may serve as an intermediary for allowing the API 145 or the application programs 147 to communicate with the kernel 141 to exchange data.

Also, the middleware 143 may process one or more task requests received from the application programs 147 according to priorities thereof. For example, the middleware 143 may assign priorities for using the system resources (e.g., the bus 110, the processor 120, the memory 130, or the like) of the electronic device 101, to at least one of the application programs 147. For example, the middleware 143 may perform scheduling or loading balancing on the one or more task requests by processing the one or more task requests according to the priorities assigned thereto.

The API 145 is an interface through which the applications 147 control functions provided from the kernel 141 or the middleware 143, and may include, for example, at least one interface or function (e.g., instruction) for file control, window control, image processing, character control, and the like.

The input/output interface 150, for example, may function as an interface that may transfer commands or data input from a user or another external device to the other element(s) of the electronic device 101. Furthermore, the input/output interface 150 may output the commands or data received from the other element(s) of the electronic device 101 to the user or another external device.

Examples of the display 160 may include a Liquid Crystal Display (LCD), a Light-Emitting Diode (LED) display, an Organic Light-Emitting Diode (OLED) display, a Micro Electro Mechanical Systems (MEMS) display, and an electronic paper display. The display 160 may display, for example, various types of contents (e.g., text, images, videos, icons, or symbols) to users. The display 160 may include a touch screen, and may receive, for example, a touch, gesture, proximity, or hovering input using an electronic pen or a user's body part.

The communication interface 170 may establish communication, for example, between the electronic device 101 and an external device (e.g., a first external electronic device 102, a second external electronic device 104, or a server 106). For example, the communication interface 170 may be connected to a network 162 through wireless or wired communication, and may communicate with an external device (e.g., the second external electronic device 104 or the server 106). The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), Wireless Broadband (WiBro), and Global System for Mobile Communications (GSM), as a cellular communication protocol. In addition, the wireless communication may include, for example, short range communication 164. The short-range communication 164 may include at least one of, for example, Wi-Fi®, Bluetooth® (BT), Near Field Communication (NFC), and Global Navigation Satellite System (GNSS). GNSS may include, for example, at least one of global positioning system (GPS), global navigation satellite system (GLONASS), BeiDou Navigation satellite system (BeiDou) or Galileo (the European global satellite-based navigation system), based on a location, a bandwidth, or the like. Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), and a Plain Old Telephone Service (POTS). The network 162 may include at least one of a telecommunication network such as a computer network (e.g., a LAN or a WAN), the Internet, and a telephone network.

Each of the first and second external electronic devices 102 and 104 may be of a type identical to or different from that of the electronic device 101. According to an embodiment of the present disclosure, the server 106 may include a group of one or more servers. According to various embodiments of the present disclosure, all or some of the operations performed in the electronic device 101 may be executed in another electronic device or a plurality of electronic devices (e.g., the electronic devices 102 and 104 or the server 106). According to an embodiment of the present disclosure, when the electronic device 101 has to perform some functions or services automatically or in response to a request, the electronic device 101 may request another device (e.g., the electronic device 102 or 104 or the server 106) to execute at least some functions relating thereto instead of or in addition to autonomously performing the functions or services. Another electronic device (e.g., the electronic device 102 or 104, or the server 106) may execute the requested functions or the additional functions, and may deliver a result of the execution to the electronic device 101. The electronic device 101 may process the received result as it is or additionally, and may provide the requested functions or services. To this end, for example, cloud computing, distributed computing, or client-server computing technologies may be used.

Figure 2:
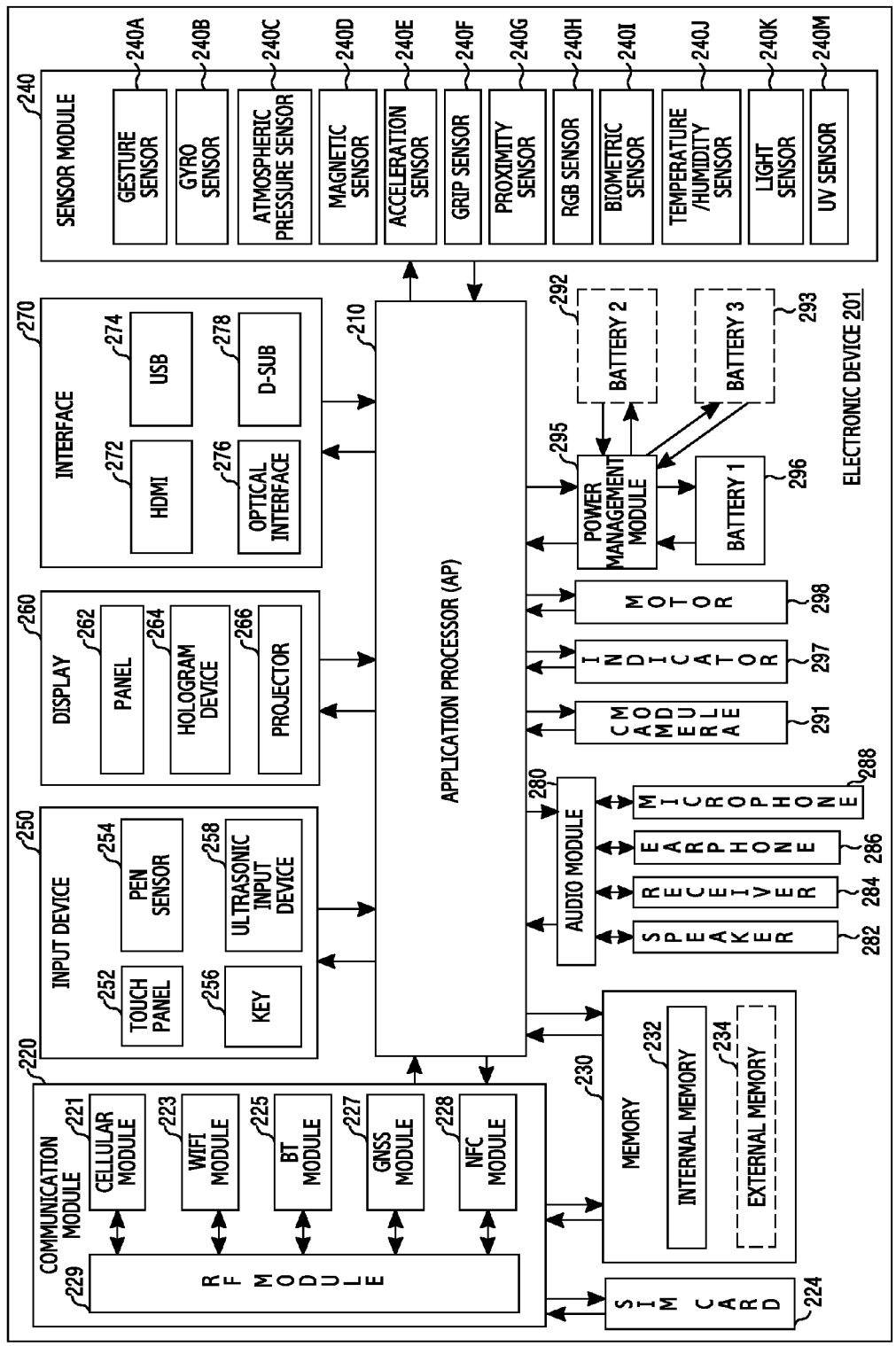
FIG. 2 illustrates a configuration of an electronic device according to various embodiments.

FIG. 2 illustrates an electronic device according to various embodiments of the present disclosure.

The electronic device 201 may include, for example, all or a part of the electronic device 101 shown in FIG. 1. The electronic device 201 may include one or more processors 210 (e.g., Application Processors (AP)), a communication module 220, a memory 230, a sensor module 240, an input device 250, a display 260, an interface 270, an audio module 280, a camera module 291, a power management module 295, a battery 1 296, an indicator 297, and a motor 298.

The processor 210 may control a plurality of hardware or software components connected to the processor 210 by driving an operating system or an application program, and perform processing of various pieces of data and calculations. The processor 210 may be embodied as, for example, a System on Chip (SoC). According to an embodiment of the present disclosure, the processor 210 may further include a Graphic Processing Unit (GPU) and/or an image signal processor. The processor 210 may include at least some (for example, a cellular module 221) of the components illustrated in FIG. 2. The processor 210 may load, into a volatile memory, commands or data received from at least one (e.g., a non-volatile memory) of the other components and may process the loaded commands or data, and may store various data in a non-volatile memory.

The communication module 220 may have a configuration equal or similar to that of the communication interface 170 of FIG. 1. The communication module 220 may include, for example, a cellular module 221, a Wi-Fi module 223, a BT module 225, a GNSS module 227 (e.g., a GPS module 227, a GLONASS module, a BeiDou module, or a Galileo module), an NFC module 228, and a Radio Frequency (RF) module 229.

The cellular module 221, for example, may provide a voice call, a video call, a text message service, or an Internet service through a communication network. According to an embodiment of the present disclosure, the cellular module 221 may distinguish and authenticate the electronic device 201 in a communication network using a subscriber identification module (SIM) card 224. According to an embodiment of the present disclosure, the cellular module 221 may perform at least some of the functions that the processor 210 may provide. According to an embodiment of the present disclosure, the cellular module 221 may include a communication processor (CP).

For example, each of the Wi-Fi module 223, the BT module 225, the GNSS module 227, and the NFC module 228 may include a processor for processing data transmitted/received through a corresponding module. According to an embodiment of the present disclosure, at least some (e.g., two or more) of the cellular module 221, the Wi-Fi module 223, the BT module 225, the GNSS module 227, and the NFC module 228 may be included in one Integrated Chip (IC) or IC package.

The RF module 229, for example, may transmit/receive a communication signal (e.g., an RF signal). The RF module 229 may include, for example, a transceiver, a Power Amplifier Module (PAM), a frequency filter, a Low Noise Amplifier (LNA), and an antenna. According to another embodiment of the present disclosure, at least one of the cellular module 221, the Wi-Fi module 223, the BT module 225, the GNSS module 227, and the NFC module 228 may transmit/receive an RF signal through a separate RF module.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an embedded memory 232 or an external memory 234. The embedded memory 232 may include at least one of a volatile memory (e.g., a Dynamic Random Access Memory (DRAM), a Static RAM (SRAM), a Synchronous Dynamic RAM (SDRAM), and the like) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard disc drive, a Solid State Drive (SSD), and the like).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a MultiMediaCard (MMC), a memory stick, or the like. The external memory 234 may be functionally and/or physically connected to the electronic device 201 through various interfaces.

The sensor module 240, for example, may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor (barometer) 240C, a magnetic sensor 240D, an acceleration sensor 240E, a grip sensor 240F, a proximity sensor 240G, a color sensor 240H (e.g., red, green, and blue (RGB) sensor), a biometric sensor (medical sensor) 240I, a temperature/humidity sensor 240J, an illuminance sensor 240K, and a Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris scan sensor, and/or a finger scan sensor. The sensor module 240 may further include a control circuit for controlling one or more sensors included therein. According to an embodiment of the present disclosure, the electronic device 201 may further include a processor configured to control the sensor module 240, as a part of the processor 210 or separately from the processor 210, and may control the sensor module 240 while the processor 210 is in a sleep state.

The input device 250 may include, for example, a touch panel 252, a (digital) pen sensor 254, a key 256, or an ultrasonic input device 258. The touch panel 252 may use, for example, at least one of a capacitive type, a resistive type, an infrared type, and an ultrasonic type. The touch panel 252 may further include a control circuit. The touch panel 252 may further include a tactile layer, and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect, through a microphone (e.g., the microphone 288), ultrasonic waves generated by an input tool, and identify data corresponding to the detected ultrasonic waves.

The display 260 (e.g., the display 160) may include a panel 262, a hologram device 264, or a projector 266. The panel 262 may include a configuration identical or similar to the display 160 illustrated in FIG. 1. The panel 262 may be implemented to be, for example, flexible, transparent, or wearable. The panel 262 may be embodied as a single module with the touch panel 252. The hologram device 264 may show a three dimensional (3D) image in the air by using an interference of light. The projector 266 may project light onto a screen to display an image. The screen may be located, for example, in the interior of or on the exterior of the electronic device 201. According to an embodiment of the present disclosure, the display 260 may further include a control circuit for controlling the panel 262, the hologram device 264, or the projector 266.

The interface 270 may include, for example, a High-Definition Multimedia Interface (HDMI) 272, a Universal Serial Bus (USB) 274, an optical interface 276, or a D-sub-miniature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280, for example, may bilaterally convert a sound and an electrical signal. At least some components of the audio module 280 may be included in, for example, the input/output interface 150 illustrated in FIG. 1. The audio module 280 may process voice information input or output through, for example, a speaker 282, a receiver 284, earphones 286, or the microphone 288.

The camera module 291 is, for example, a device which may photograph a still image and a video. According to an embodiment of the present disclosure, the camera module 291 may include one or more image sensors (e.g., a front sensor or a back sensor), a lens, an Image Signal Processor (ISP) or a flash (e.g., LED or xenon lamp).

The power management module 295 may manage, for example, power of the electronic device 201. According to an embodiment of the present disclosure, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, a residual quantity of the battery 1 296, and a voltage, a current, or a temperature while charging. The battery 1 296 may include, for example, a rechargeable battery and/or a solar battery. According to various embodiments, an electronic device 201 may include a battery 2 292 and a battery 3 293 in addition to a battery 1 296. The battery 2 292 and the battery 3 293 may be mounted inside of the electronic device 201, or formed outside of the electronic device 201. The battery 2 292 and the battery 3 293 may be functionally or physically connected with the electronic device 201 through various interfaces.

The indicator 297 may display a particular state (e.g., a booting state, a message state, a charging state, or the like) of the electronic device 201 or a part (e.g., the processor 210) of the electronic device 201. The motor 298 may convert an electrical signal into a mechanical vibration, and may generate a vibration, a haptic effect, or the like. Although not illustrated, the electronic device 201 may include a processing device (e.g., a GPU) for supporting a mobile TV. The processing device for supporting a mobile TV may process, for example, media data according to a certain standard such as Digital Multimedia Broadcasting (DMB), Digital Video Broadcasting (DVB), or Media-FLO™.

Each of the above-described component elements of hardware according to the present disclosure may be configured with one or more components, and the names of the corresponding component elements may vary based on the type of electronic device. In various embodiments, the electronic device may include at least one of the above-described elements. Some of the above-described elements may be omitted from the electronic device, or the electronic device may further include additional elements. Also, some of the hardware components according to various embodiments may be combined into one entity, which may perform functions identical to those of the relevant components before the combination.

Figure 3:
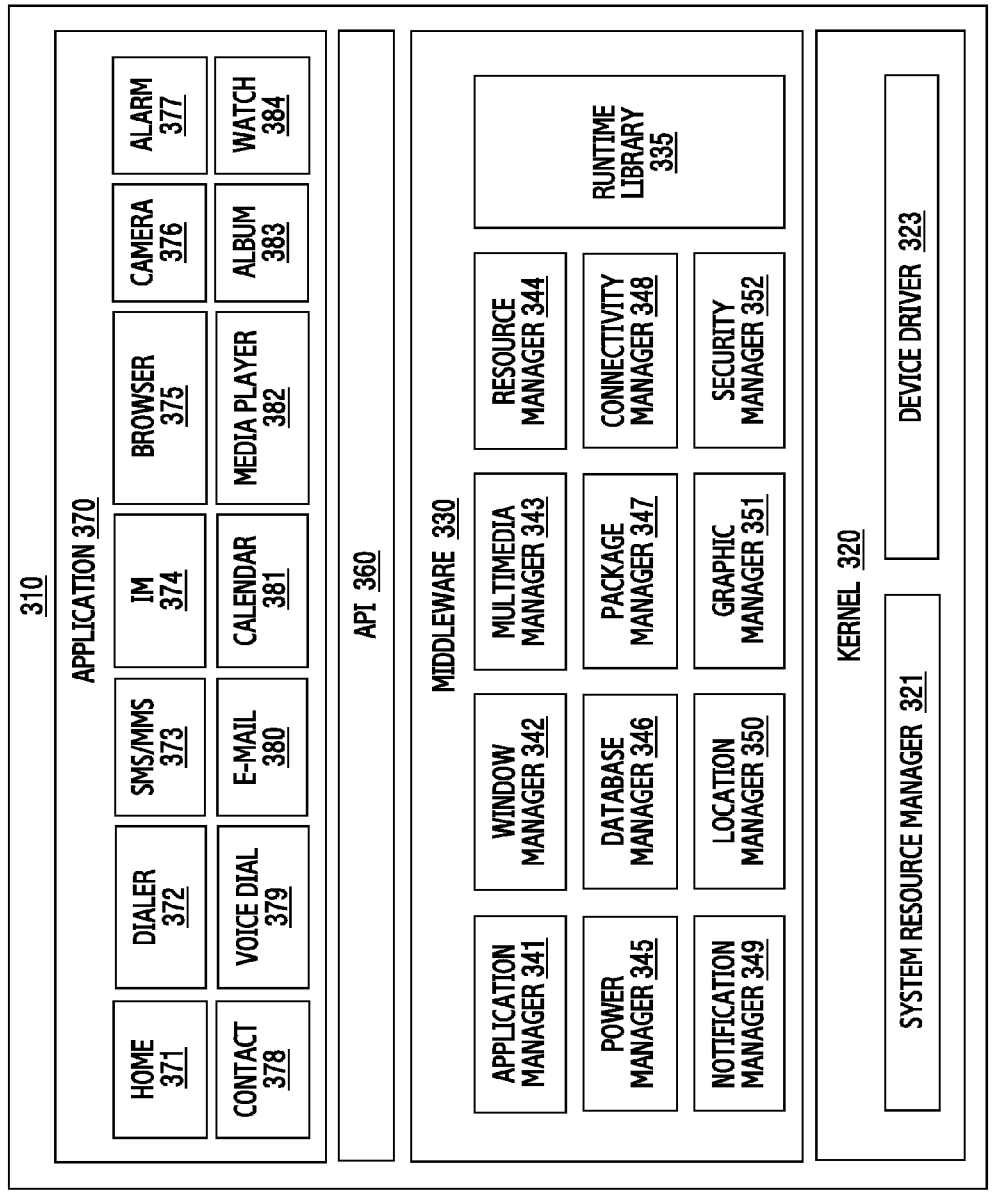
FIG. 3 illustrates a program module according to various embodiments.

FIG. 3 illustrates a program module according to various embodiments of the present disclosure.

According to an embodiment of the present disclosure, the program module 310 (e.g., the program 140) may include an Operating System (OS) for controlling resources related to the electronic device (e.g., the electronic device 101) and/or various applications (e.g., the application programs 147) executed in the operating system. The operating system may be for example, Android®, iOS™, Windows®, Symbian®, Tizen®, Samsung Bada®, or the like.

The program module 310 may include a kernel 320, middleware 330, an API 360, and/or applications 370. At least some of the program module 310 may be preloaded on an electronic device, or may be downloaded from an external electronic device (e.g., the electronic device 102 or 104, or the server 106).

The kernel 320 (e.g., the kernel 141) may include, for example, a system resource manager 321 and/or a device driver 323. The system resource manager 321 may control, allocate, or collect system resources. According to an embodiment of the present disclosure, the system resource manager 321 may include a process management unit, a memory management unit, a file system management unit, and the like. The device driver 323 may include, for example, a display driver, a camera driver, a Bluetooth® driver, a shared memory driver, a USB driver, a keypad driver, a Wi-Fi® driver, an audio driver, or an Inter-Process Communication (IPC) driver.

For example, the middleware 330 may provide a function required in common by the applications 370, or may provide various functions to the applications 370 through the API 360 so as to enable the applications 370 to efficiently use the limited system resources in the electronic device. According to an embodiment of the present disclosure, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while an application 370 is being executed. The runtime library 335 may perform input/output management, memory management, the functionality for an arithmetic function, or the like.

The application manager 341 may manage, for example, a life cycle of at least one of the applications 370. The window manager 342 may manage Graphical User Interface (GUI) resources used by a screen. The multimedia manager 343 may recognize a format required for reproduction of various media files, and may perform encoding or decoding of a media file by using a codec suitable for the corresponding format. The resource manager 344 may manage resources of a source code, a memory, and a storage space of at least one of the applications 370.

The power manager 345 may operate together with, for example, a Basic Input/Output System (BIOS) or the like to manage a battery or power source and may provide power information or the like required for the operations of the electronic device. The database manager 346 may generate, search for, and/or change a database to be used by at least one of the applications 370. The package manager 347 may manage installation or an update of an application distributed in a form of a package file.

For example, the connectivity manager 348 may manage wireless connectivity such as Wi-Fi® or Bluetooth®. The notification manager 349 may display or notify of an event such as an arrival message, promise, proximity notification, and the like in such a way that does not disturb a user. The location manager 350 may manage location information of an electronic device. The graphic manager 351 may manage a graphic effect which will be provided to a user, or a user interface related to the graphic effect. The security manager 352 may provide all security functions required for system security, user authentication, or the like. According to an embodiment of the present disclosure, when the electronic device (e.g., the electronic device 101) has a telephone call function, the middleware 330 may further include a telephony manager for managing a voice call function or a video call function of the electronic device.

The middleware 330 may include a middleware module that forms a combination of various functions of the above-described components. The middleware 330 may provide a module specialized for each type of OS in order to provide a differentiated function. Further, the middleware 330 may dynamically remove some of the existing components or add new components.

The API 360 (e.g., the API 145) is, for example, a set of API programming functions, and may be provided with a different configuration according to an OS. For example, in the case of Android or iOS, one API set may be provided for each platform. In the case of Tizen®, two or more API sets may be provided for each platform.

The applications 370 (e.g., the application programs 147) may include, for example, one or more applications which may provide functions such as a home 371, a dialer 372, a short messaging service/multimedia messaging service (SMS/MMS) 373, an Instant Message (IM) 374, a browser 375, a camera 376, an alarm 377, contacts 378, a voice dial 379, an email 380, a calendar 381, a media player 382, an album 383, a clock 384, health care (e.g., measuring exercise quantity or blood sugar), or environment information (e.g., providing atmospheric pressure, humidity, or temperature information).

According to an embodiment of the present disclosure, the applications 370 may include an application (hereinafter, referred to as an "information exchange application" for convenience of description) that supports exchanging information between the electronic device (e.g., the electronic device 101) and an external electronic device (e.g., the electronic device 102 or 104). The information exchange application may include, for example, a notification relay application for transferring specific information to an external electronic device or a device management application for managing an external electronic device.

For example, the notification relay application may include a function of transferring, to the external electronic device (e.g., the electronic device 102 or 104), notification information generated from other applications of the electronic device 101 (e.g., an SMS/MMS application, an e-mail application, a health management application, or an environmental information application). Further, the notification relay application may receive notification information from, for example, an external electronic device and provide the received notification information to a user.

The device management application may manage (e.g., install, delete, or update), for example, at least one function of an external electronic device (e.g., the electronic device 102 or 104) communicating with the electronic device (e.g., a function of turning on/off the external electronic device itself (or some components) or a function of adjusting the brightness (or a resolution) of the display), applications operating in the external electronic device, and services provided by the external electronic device (e.g., a call service or a message service).

According to an embodiment of the present disclosure, the applications 370 may include applications (e.g., a health care application of a mobile medical appliance or the like) designated according to an external electronic device (e.g., attributes of the electronic device 102 or 104). According to an embodiment of the present disclosure, the applications 370 may include an application received from an external electronic device (e.g., the server 106, or the electronic device 102 or 104). According to an embodiment of the present disclosure, the applications 370 may include a preloaded application or a third party application that may be downloaded from a server. The names of the components of the program module 310 of the illustrated embodiment of the present disclosure may change according to the type of operating system.

According to various embodiments, at least a part of the programming module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable recoding media may be, for example, the memory 130.

Figure 4:
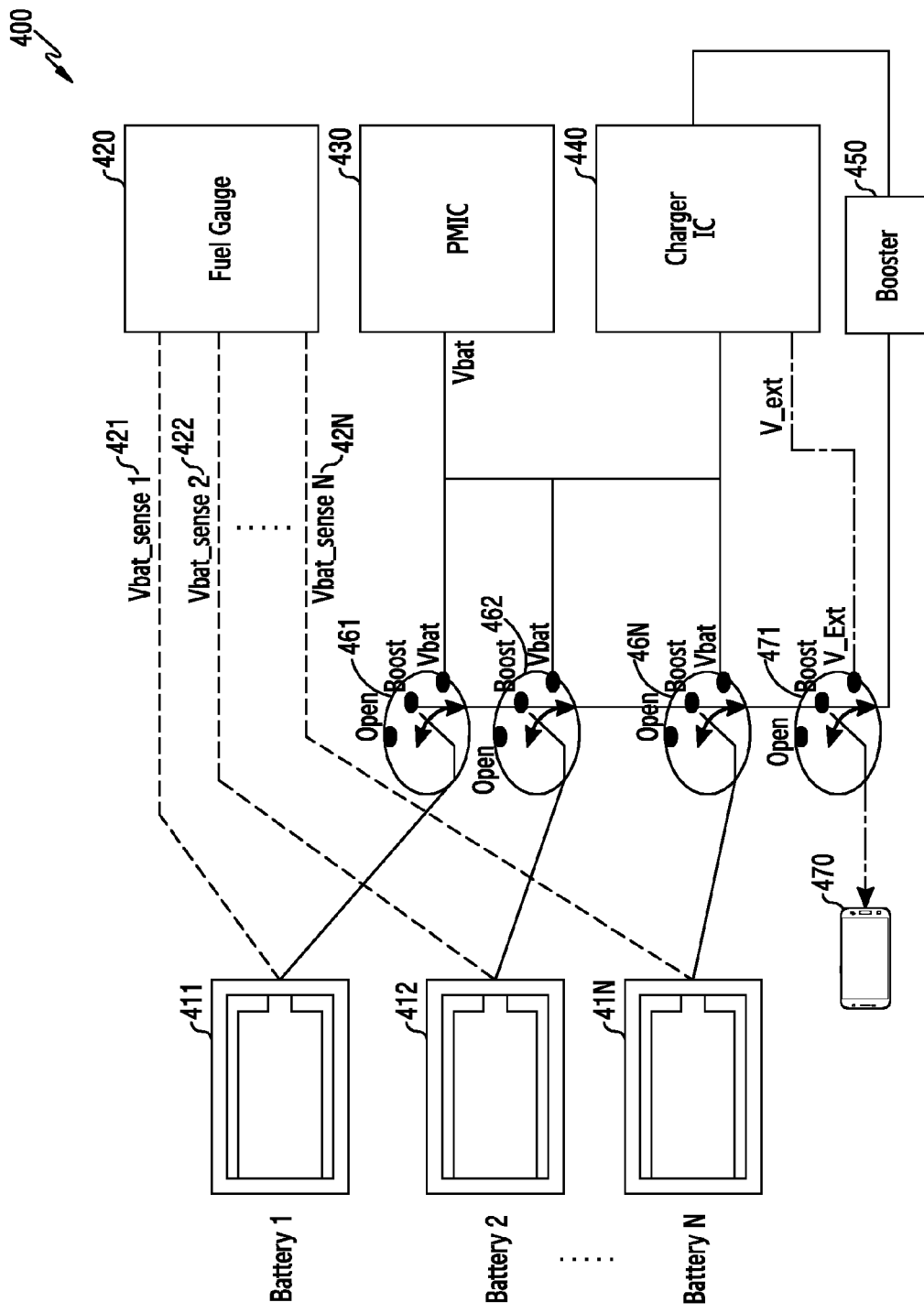
FIG. 4 illustrates a battery control circuit of an electronic device according to various embodiments.

FIG. 4 illustrates a battery control circuit of an electronic device according to various embodiments. Such a battery control circuit may be implemented in an electronic device. Hereinafter, the electronic device may be the electronic device 101 of FIG. 1 or the electronic device 201 of FIG. 2.

For the convenience of description, the electronic device 201 of FIG. 2 is an electronic device.

Referring to FIG. 4, a battery control circuit 400 may include a first battery 411, a second battery 412, a Nth battery 41N (here, N is a whole number), a remaining battery charge measurement circuit or fuel gauge 420, a power management integrated circuit (PMIC) 430, a charging circuit, e.g., charger integrated circuit (IC) 440, a booster circuit 450, a first switch 461, a second switch 462, and Nth switch 46N, or an external control switch 471. The battery control circuit 400 may be connected with a processor 210 of the electronic device 201 and control a battery according to a control of the processor 210. The processor 210 may be interpreted as a control circuit.

The first battery 411, the second battery 412, and the Nth battery 41N may be arranged to be spaced, and each of which includes an anode and a cathode. That is, the first battery 411, the second battery 412, and the Nth battery 41N may mean objects each of which is independent from each other, and may not mean multi-cells in a battery. At least one of the first battery 411, second battery 412, and Nth battery 41N may be mounted inside of the electronic device 201 or formed outside of the electronic device 201. Hereinafter, "N" in the Nth battery 41N is a whole number "three" but may be interpreted as a whole number greater than three, for the convenience of description. At least one of the first battery 411, the second battery 412, and the Nth battery 41N may be functionally or physically connected with the electronic device 201 through various interfaces. For example, the first battery 411, the second battery 412, and the Nth battery 41N may include a rechargeable battery and/or a solar cell.

The remaining battery charge measurement circuit 420 may measure information of batteries 411-41N. For example, information of batteries 411-41N may include the amount of remaining charge, a voltage during charging, current, or temperature. For example, the remaining battery charge measurement circuit 420 may measure information of the first battery 411 based on a signal received through a first line 421 (Vbat_sense 1) connected to the first battery 411. The remaining battery charge measurement circuit 420 may measure information of the second battery 412 based on a signal received through a second line 422 (Vbat_sense 2) connected to the second battery 412. The remaining battery charge measurement circuit 420 may measure information of the Nth battery 41N based on a signal received through an Nth line (Vbat_sense N) 42N connected to the Nth battery 41N. The remaining battery charge measurement circuit 420 may transmit measured information of batteries 411-41N to the processor 210.

The processor 210 may monitor the capacity of batteries 411-41N to identify whether the batteries 411-41N are connected to the electronic device 201, based on the transmitted signal. The processor 210 may display a user interface for information of the monitored batteries on a display 260. According to various embodiments, the processor 210 may control batteries 411-41N, based on the information of the monitored batteries. Alternatively, a user of the electronic device 201 may identify the user interface for information of the batteries, and the processor 210 may control batteries 411-41N according to a command input by the user.

According to various embodiments, the processor 210 may display a user interface for the capacity of a battery when the capacity of a battery currently in use is lower than a reference level. The processor 210 may select a battery to be used as a main battery for the electronic device 201, according to a command input by the user. Alternatively, the processor 210 may determine a priority order for each of batteries 411-41N according to information of the monitored batteries or a configuration by the user, and select a battery to be used as a main battery for the electronic device 201 according to the priority order. According to various embodiments, the processor 210 may control the charging of batteries 411-41N when a charger is connected to the electronic device 201. Alternatively, the processor 210 may transfer an electric charge among batteries according to a selection by the user.

The PMIC 430 may manage the power of the electronic device 201. The PMIC 430 may have a wired and/or wireless charging scheme. For example, a magnetic resonance scheme, a magnetic induction scheme, an electromagnetic scheme, etc. may be included and additional circuits (e.g., a coil loop, a resonance circuit, a rectifier, etc.) for wireless charging may be further included.

The charger IC 440 may provide voltage entering through the booster circuit 450 or an external device (e.g., a charger) to the PMIC 430 and at least one of the first battery 411, the second battery 412, and the Nth battery 41N.

The booster circuit 450 may be connected with at least one of the first battery 411, the second battery 412, and the Nth battery 41N, boost the voltage of a connected battery, and provide the boosted voltage to the charger IC 440.

The first switch 461 may be electrically connected with the first battery 411, the second switch 462 may be electrically connected with the second battery 412, and the Nth switch 46N electrically connected with the Nth battery 41N. The first switch 461, second switch 462, and Nth switch 46N may be a three-point switch having an open node, a boost node, and a power node (Vbat node). The open node is a node in which no electrical route is formed with any circuit. A battery connected to the open node, which is not used by the electronic device 201, may not be used as a main power and may not be charged, either. The boost node is a node connected to the booster circuit 450 and the charger IC 440. That is, a battery connected to the boost node may pass over an electric charge (or current or voltage) to another battery. The power node is a node connected to the power management integrated circuit 430 and the charger IC 440. That is, a battery connected to the power node may be used as a main power for the electronic device 201, or may be charged.

The external control switch 471 may be electrically connected with an external device 470. The external control switch 471 may be a three-point switch having an open node, a boost node, and an external charge node (V_Ext node). The external charge node may transfer at least one electric charge (or current or voltage) of the first battery 411, the second battery 412, and the Nth battery 41N to the external device 470. The boost node may be connected with the booster circuit 450 and the charger IC 440, and pass over the electric charge (or current or voltage) of the external device 470 to at least one of the first battery 411, the second battery 412, and the Nth battery 41N. This external control switch 471 may determine a node to be connected according to a control of the processor 210.

The first switch 461, second switch 462, and Nth switch 46N may determine a node to be connected to batteries 411-41N according to a control of the processor 210. For example, the processor 210 may control, using the first switch 461, a first state in which the first battery 411 is electrically connected to the power management integrated circuit 430 and the charger IC 440. That is, the first switch 461 may connect the first battery 411 to an electric node, and connect the first battery 411 to the power management integrated circuit 430 and the charger IC 440. The processor 210 may control, using the first switch 461, a second state in which the first battery 411 is electrically connected to the booster circuit 450 and the charger IC 440. That is, the first switch 461 may connect the first battery 411 to the boost node, and connect the first battery 411 to the booster circuit 450 and the charger IC 440. The processor 210 may control, using the first switch 461, a third state in which the first battery 411 forms an open circuit. That is, the first switch 461 may connect the first battery 411 to the open node, and control the first battery 411 to form an open circuit. Since the first battery 411 connected to the open circuit is opened in a circuit, the first battery 411 is removable from the electronic device 201 and can be charged through an external charger.

The processor 210 may also control the second switch 462 and the Nth switch 46N, similarly to or the same as the first switch 461. The processor 210 may control, using the second switch 462, one of a fourth state in which the second battery 412 is electrically connected to the power management integrated circuit 430 and the charger IC 440, a fifth state in which the second battery 412 is electrically connected to the booster circuit 450 and the charger IC 440, and a sixth state in which the second battery 412 forms an open circuit. That is, the second switch 462 may connect the second battery 412 to at least one of the open circuit, the power management integrated circuit 430 and the charger IC 440, and the booster circuit 450, according to a control of the processor 210. The Nth switch 46N may connect the Nth battery 41N to at least of the open circuit, the power management integrated circuit 430 and the charger IC 440, and the booster circuit 450, according to a control of the processor 210.

Figure 5A:
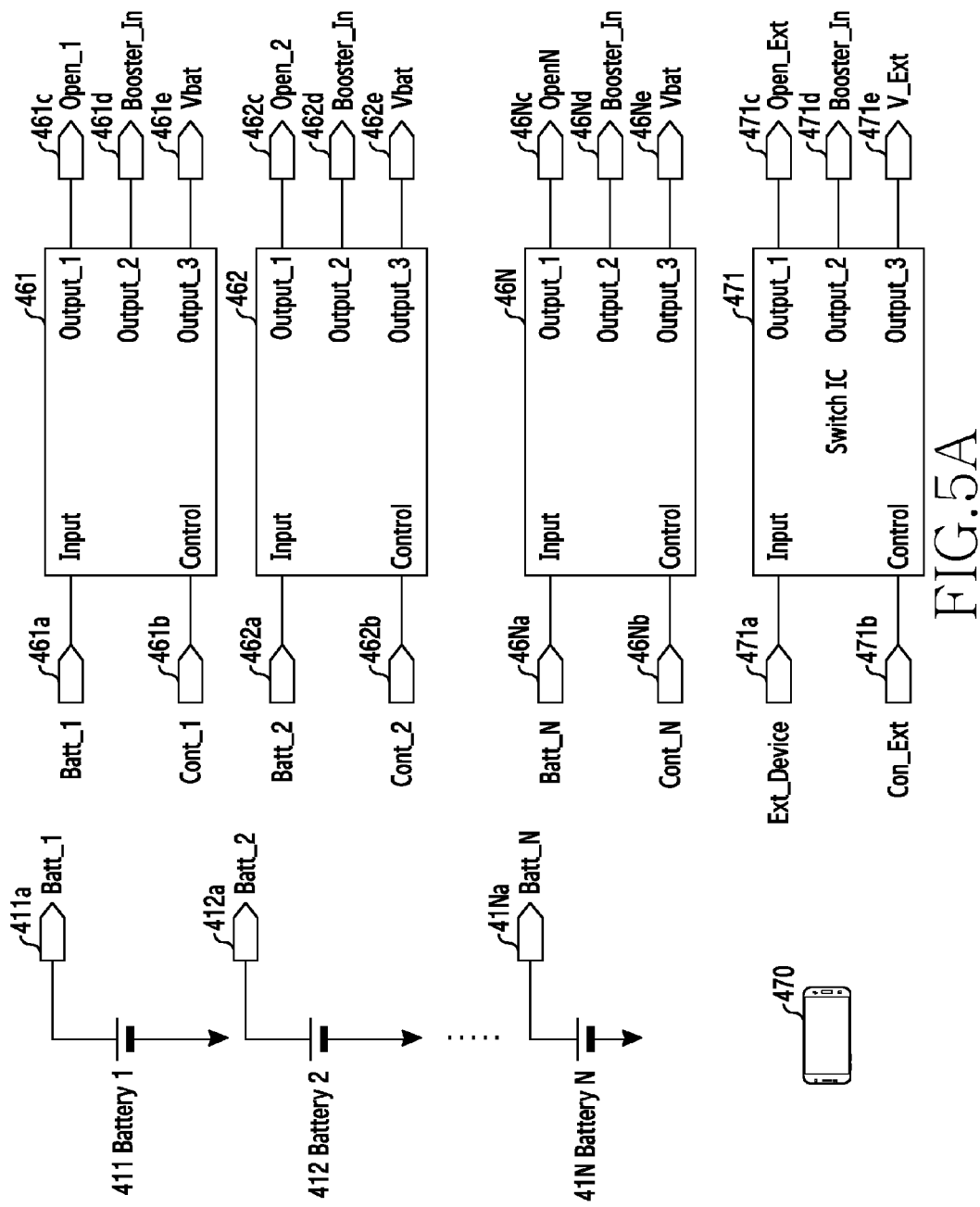
FIG. 5A illustrates a switch circuit of a battery according to various embodiments.

FIG. 5A illustrates a switch circuit of a battery according to various embodiments.

Referring to FIG. 5A, the first switch 461, the second switch 462, and the Nth switch 46N may be formed with an input terminal (Batt), a control terminal (Cont), and three output terminals (Open, Booster, Vbat). For example, the first switch 461 may include a Batt_1 461a, a Cont_1 461b, an Open_1 461c, a Booster_In 461d, or a Vbat 461e. The Batt_1 461a is an input terminal and may be connected with a Batt_1 411a of the first battery 411. The Cont_1 461b is a control terminal and may be connected with the processor 210. The Open_1 461c is an output terminal and may be connected with an open circuit. The Booster_In 461d is an output terminal and may be electrically connected with the booster circuit 450 and the charger IC 440. The Vbat 461e is an output terminal and may be electrically connected with the power management integrated circuit 430 and the charger IC 440. The first switch 461 may connect, according to a control signal coming in through the Cont_1 461b, the Batt_1 461a to the Open_1 461c, to the Booster_In 461d, or to the Vbat 461e.

The second switch 462 may include a Batt_2 462a, a Cont_2 462b, an Open_2 462c, a Booster_In 462d, or a Vbat 462e. The Batt_2 462a may be connected with a Batt_2 412a of the second battery 412. The Cont_2 462b may be connected with the processor 210. The Open_2 462c may be connected with an open circuit, the Booster_In 462d may be electrically connected with the booster circuit 450 and the charger IC 440, and the Vbat 462e may be electrically connected with the power management integrated circuit 430 and the charger IC 440. The second switch 462 may connect, according to a control signal coming in through the Cont_2 462b, the Batt_2 462a to the Open_2 462c, to the Booster_In 462d, or to the Vbat 462e.

The Nth switch 46N may include a Batt_N 46Na, a Cont_N 46Nb, an Open_N 46Nc, a Booster_In 46Nd, or a Vbat 46Ne. The Batt_N 46Na may be connected with a Batt_N 41Na of the Nth battery 41N. The Cont_N 46Nb may be connected with the processor 210. The Open_N 46Nc may be connected with an open circuit, the Booster_In 46Nd may be electrically connected with the booster circuit 450 and the charger IC 440, and the Vbat 46Ne may be electrically connected with the power management integrated circuit 430 and the charger IC 440. The Nth switch 46N may connect, according to a control signal coming in through the Cont_N 46Nb, the Batt_N 46Na to the Open_N 46Nc, to the Booster_In 46Nd, or the Vbat 46Ne.

The external control switch 471 may be formed with an input terminal (Ext_Device) 471a, a control terminal (Cont_Ext) 471b, and three output terminals (Open, Booster, V_Ext). For example, the external control switch 471 may include an Ext_Device 471a, a Cont_Ext 471b, an Open_Ext 471c, a Booster_In 471d, or a V_Ext 471e. The Ext_Device 471a may be connected with a battery of the external device 470. The Cont_Ext 471b may be connected with the processor 210. The Open_Ext 471c may be connected with an open circuit, the Booster_In 471d may be electrically connected with the booster circuit 450 and the charger IC 440, and the V_Ext 471e may be electrically connected with the charger IC 440. The external control switch 471 may connect, according to a control signal coming in through the Cont_Ext 471b, the Ext_Device 471a to the Open_Ext 471c, to the Booster_In 471d, or to the V_Ext 471e.

Figure 5B:
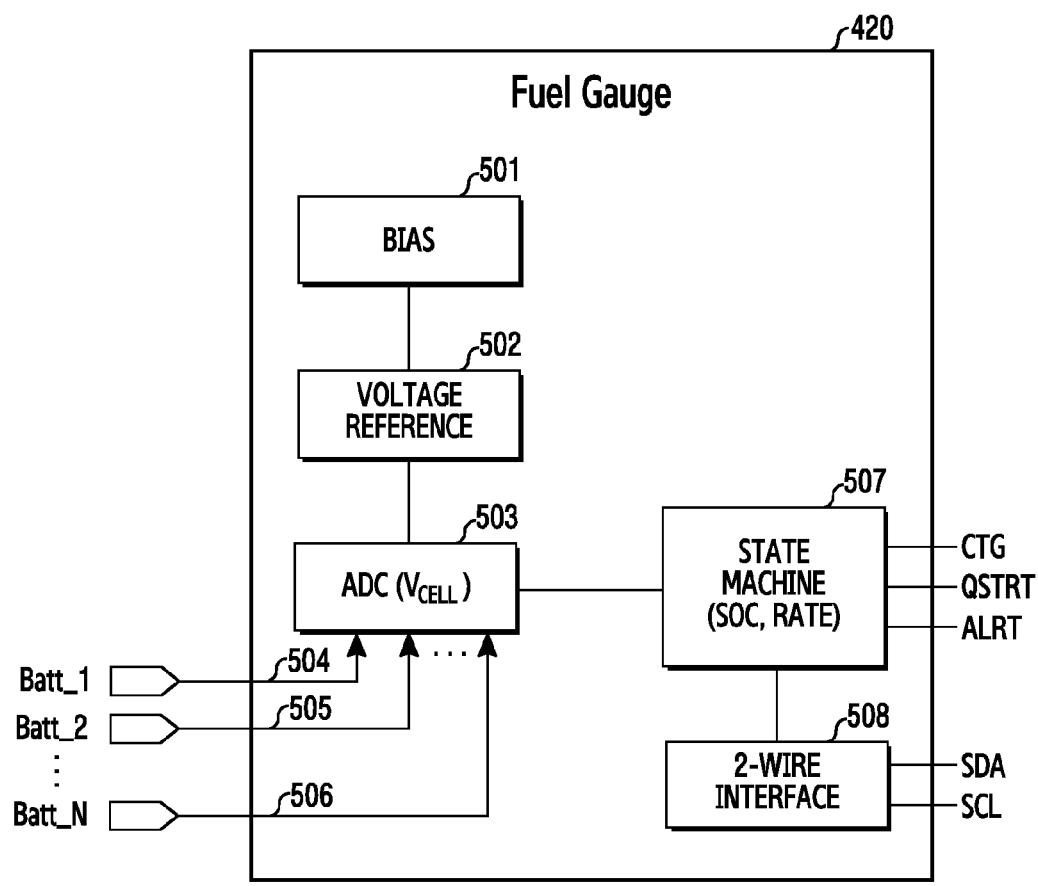
FIG. 5B illustrates a remaining battery charge measurement circuit according to various embodiments.

FIG. 5B illustrates a remaining battery charge measurement circuit according to various embodiments.

Referring to FIG. 5B, the remaining battery charge measurement circuit 420 may include a bias 501, a voltage reference 502, an ADC 503, a state machine 507, and a two-wire interface 508. The remaining battery charge measurement circuit 420 may measure the capacity of a battery based on the voltage value of the battery. Alternatively, the remaining battery charge measurement circuit 420 may calculate the capacity of a battery by measuring the current flowing in the battery.

The bias 501 may be connected with a power terminal (Vdd). The bias 501 may adjust a voltage value such that power applied by the power terminal (Vdd) maintains a constant value. The voltage reference 502 may include a reference voltage value, which is a reference to measure the capacities of batteries 411-41N.

The analog-digital converter (ADC) 503 may receive a voltage value of a battery from at least one of the first battery 411, the second battery 412, and the Nth battery 41N. The ADC 503 may receive the voltage value of the first battery 411 through a first input terminal 504 connected with the Batt_1 411a of the first battery 411. The ADC 503 may receive the voltage value of the second battery 412 through a second input terminal 505 connected with the Batt_2 412a of the second battery 412. The ADC 503 may receive the voltage value of the Nth battery 41N through an Nth input terminal 506 connected with a Batt_N 41Na of the Nth battery 41N. Here, the voltage values received from the batteries 411-41N are analog, and the ADC 503 may convert the analog voltage value into digital and transmit the same to the state machine 507. The ADC 503 may simultaneously or sequentially convert the voltage values of the batteries 411-41N into digital and transmit the same to the state machine 507.

The state machine 507 may perform an operation for correcting an error caused by temperature, time, and impedance of the digital voltage value transmitted through an algorithm within the state machine 507, and measuring the capacities of the batteries 411-41N more accurately. The two-wire interface 508 may be connected to serial data (SDA) and a serial clock (SCL).

The electronic device 201 may measure information of batteries 411-41N using various measurement circuits in addition to the remaining battery charge measurement circuit 420 illustrated in FIG. 5B.

Figure 5C:
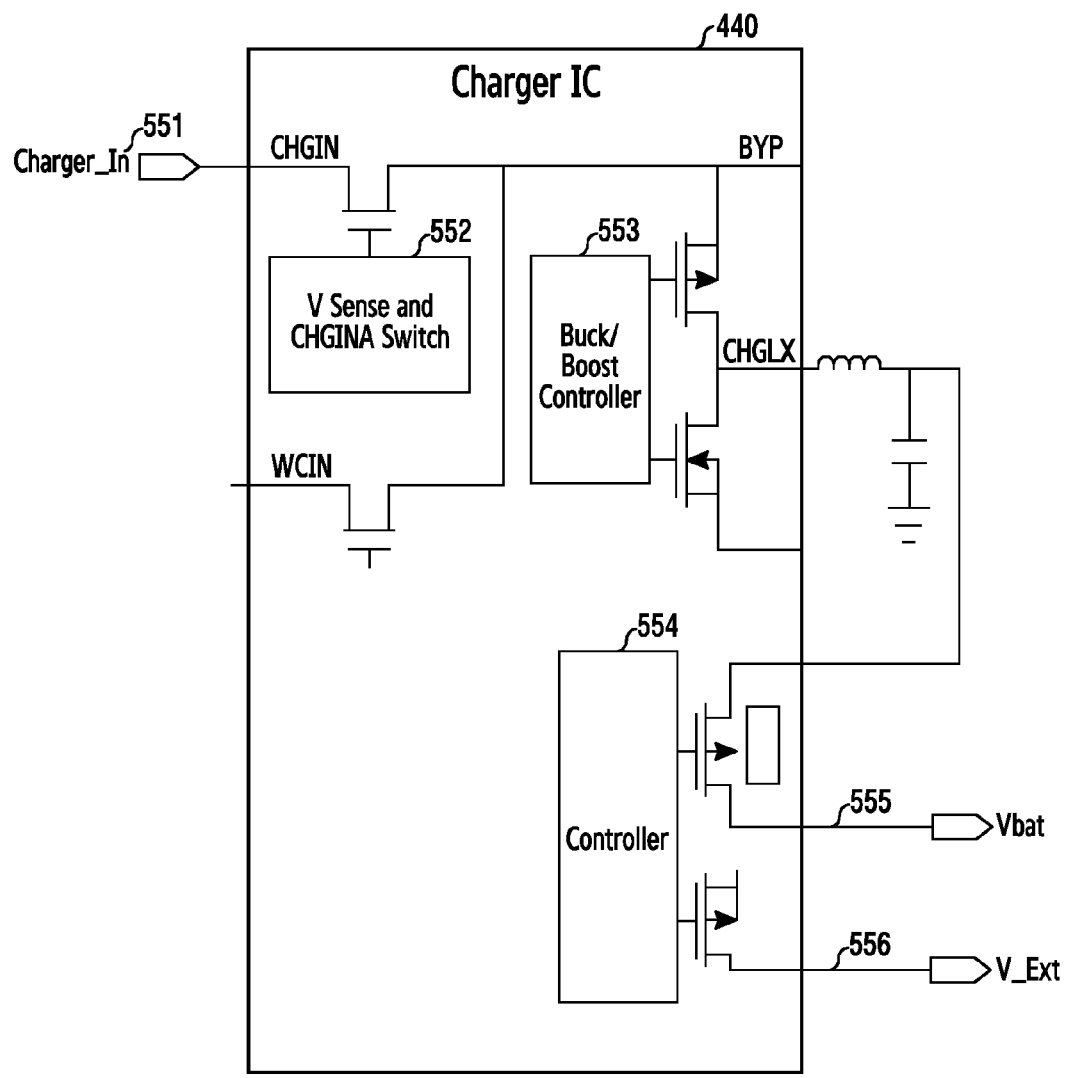
FIG. 5C illustrates a charging circuit according to various embodiments.

FIG. 5C illustrates a charging circuit according to various embodiments.

Referring to FIG. 5C, the charger IC 440 may include a Charger_In 551, a V sense and a CHGINA switch 552, a buck/boost controller 553, a controller 554, a Vbat 555, and a V_Ext 556. When the charger IC 440 operates in a charging mode, a DC-DC converter in a switch mode may operate in a buck mode.

The Charger_In 551 may be connected with a Charger_In 575 of the booster circuit 450. When the Charger_In 551 is connected with the Charger_In 575 of the booster circuit 450, a voltage may be applied from the booster circuit 450. The V sense and the CHGINA switch 552 generate an alternating current by on/off-switching the voltage that has come in through the Charger_In 551. The generated current is converted into a direct current through an inductor so as to be charged in a capacitor.

The controller 554 may switch a charging operation and a buck/boost mode according to a situation, or control a route at the time of the charging operation to an external output. The controller 554 may provide the voltage charged in the capacitor to the Vbat 555 or the V_Ext 556. For example, the controller 554 may provide the voltage charged in the capacitor to the Vbat 555 when an external device is not connected through the V_Ext 556 of the charger IC 440. The controller 554 may provide the voltage charged in the capacitor to an external device when the external device is connected through the V_Ext 556 of the charger IC 440.

The electronic device 201 may charge batteries 411-41N using various charging circuits in addition to the charging circuit 440 illustrated in FIG. 5C.

Figure 5D:
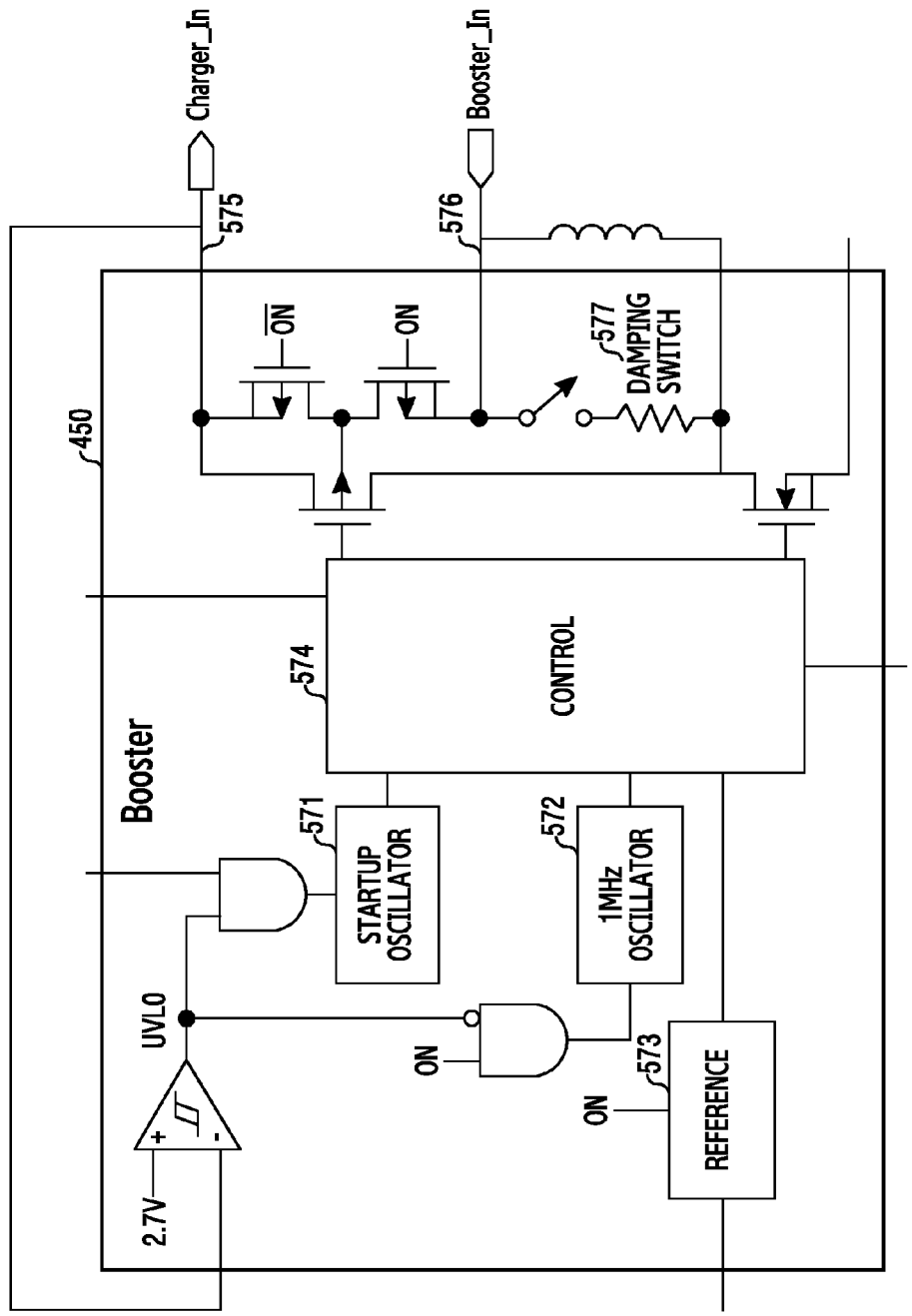
FIG. 5D illustrates a booster circuit according to various embodiments.

FIG. 5D illustrates a booster circuit according to various embodiments.

Referring to FIG. 5D, the booster circuit 450 may include a startup oscillator 571, a one MHz oscillator 572, a reference 573, a control 574, a Charger_In 575, a Booster_In 576, and a damping switch 577. In the booster circuit 450, a DC-DC converter in a switch mode may operate in a booster mode. Since this booster circuit 450 controls an output voltage by duty, using a pulse width modulation (PWM), the booster circuit 450 includes a startup oscillator 571 and a one MHz oscillator 572.

In the booster circuit 450, an N channel is turned on through an N channel MOSFET and a switch controller of a P channel, and electric charges may be sufficiently collected in an inductor when the P channel is turned off. The booster circuit 450 may perform boosting while providing the electric charge having been collected to the output when the N channel is turned off and the P channel is turned on. The control 574 may have the reference 573 and adjust the accuracy of an output voltage level, using the difference between the reference 573 and the voltage having received a feedback.

The Charger_In 575 may be connected with the Charger_in 551 of the charging circuit 440. The control 574 may output electric charges having been collected, using the charging circuit 440, in the inductor when the Charger_In 575 is connected with the Charger_In 551 of the charging circuit 440.

The Booster_In 576 may be connected with at least one of the first battery 411, the second battery 412, and the Nth battery 41N. For example, an electric charge may be collected in an inductor from the first battery 411, when the Booster_In 576 is connected with the first battery 411. The electric charge collected in the inductor may be output to the Charger_in 551 of the charging circuit 440.

The damping switch 577 functions to suppress a noise caused by resonance in circuit in the inductor.

The electronic device 201 may have various booster circuits in addition to the booster circuit 450 illustrated in FIG. 5D.

An electronic device according to various embodiments may include: a housing; a first battery arranged inside of the housing; a second battery arranged inside of the housing; a power management integrated circuit (PMIC) arranged inside of the housing; a battery charging circuit arranged inside of the housing; a booster circuit arranged inside of the housing; a first switch electrically connected with the first battery; a second switch electrically connected with the second battery; and a control circuit arranged inside of the housing, wherein the control circuit is configured to provide, at least using the first switch, one of a first state in which the first battery is electrically connected with the PMIC and the battery charging circuit, a second state in which the first battery is electrically connected with the booster circuit and the battery charging circuit, and a third state in which the first battery forms an open circuit, and configured to provide, at least using the second switch, one of a fourth state in which the second battery is electrically connected with the PMIC and the battery charging circuit, a fifth state in which the second battery is electrically connected with the booster circuit and the battery charging circuit, and a sixth state in which the second battery forms an open circuit.

The control circuit (the processor 120 of FIG. 1, or the processor 210 of FIG. 2) may be configured to control the first switch and the second switch to provide the second state and the fourth state.

The control circuit may be configured to control the first switch and the second switch to provide the first state and the fifth state.

The electronic device may be electrically connected with the first battery and the second battery, and further include a remaining battery charge measurement circuit generating a signal based on the remaining battery charge of the each battery. The control circuit may be configured to control at least one of the first switch and the second switch to provide at least one of the first state to the sixth state, based on the at least a part of the signal.

The electronic device may further include a third battery arranged inside of the housing, and a third switch electrically connected with the third battery. The control circuit may be configured to select, at least using the third switch, at least one of a seventh state in which the third battery is electrically connected with the PMIC and the battery charging circuit, an eighth state in which the third battery is electrically connected to the booster circuit and the battery charging circuit, and ninth state in which the third battery forms an open circuit.

The control circuit may be configured to be capable of controlling the first switch, the second switch, and the third switch to provide the second state, the fourth state, and the ninth state.

The control circuit may be configured to control the first switch to connect the first battery to the booster circuit, and change a first voltage generated by power of the first battery to a second voltage that is higher than the first voltage.

The control circuit may be configured to charge the second battery, using power based on the second voltage.

The control circuit may be configured to connect the first battery to the open circuit and disable the first battery, by the first switch.

The first battery and the second battery be may be arranged to be spaced, and each of which may include an anode and a cathode.

The first battery or the second battery may be removable from the electronic device.

An electronic device according to various embodiments may include: a housing; a first battery arranged inside of the housing; a second battery arranged inside of the housing; a power management integrated circuit (PMIC) arranged inside of the housing; a battery charging circuit arranged inside of the housing; a booster circuit arranged inside of the housing; a remaining battery charge measurement circuit that is electrically connected with the first battery and the second battery, and generates a signal based on the remaining battery charge of each battery; and a control circuit arranged inside of the housing, wherein the control circuit is configured to provide one of a first state in which the first battery is electrically connected with the PMIC and the battery charging circuit, a second state in which the first battery is electrically connected with the booster circuit and the battery charging circuit, and a third state in which the first battery forms an open circuit, and configured to provide one of a fourth state in which the second battery is electrically connected with the PMIC and the battery charging circuit, a fifth state in which the second battery is electrically connected with the booster circuit and the battery charging circuit, and a sixth state in which the second battery forms an open circuit.

The electronic device may further include a first switch electrically connected with the first battery, and a second switch electrically connected with the second battery. The control circuit may be configured to control at least one of the first switch and the second switch to provide at least one of the first state to the sixth state, based on a part of the signal.

The control circuit may be configured to connect the first battery to the booster circuit, connect the second battery to the PMIC and the battery charging circuit, change a first voltage generated by power of the first battery to a second voltage that is higher than the first voltage, and charge the second battery, using the power based on the second voltage.

An electronic device according to various embodiments may include: a housing; a first battery and a second battery which are arranged inside of the housing; a power management integrated circuit configured to provide power to the electronic device; a processor electrically connected with the first battery, the second battery, and the power management integrated circuit; and a memory electrically connected with the processor, wherein the memory may include instructions that allows the processor, at the time of execution, to form a network capable of providing a service for charging a third battery included in an external device with the external device, change a first voltage generated by the first battery to a second voltage that is higher than the first voltage, transmit a first power based on the second voltage to the external device, and transmit a second power based on a third voltage generated by the second battery to the power management integrated circuit, wherein a first electrical route through which the first power is transmitted and a second electrical route through which the second power is transmitted do not overlap.

Figure 6:
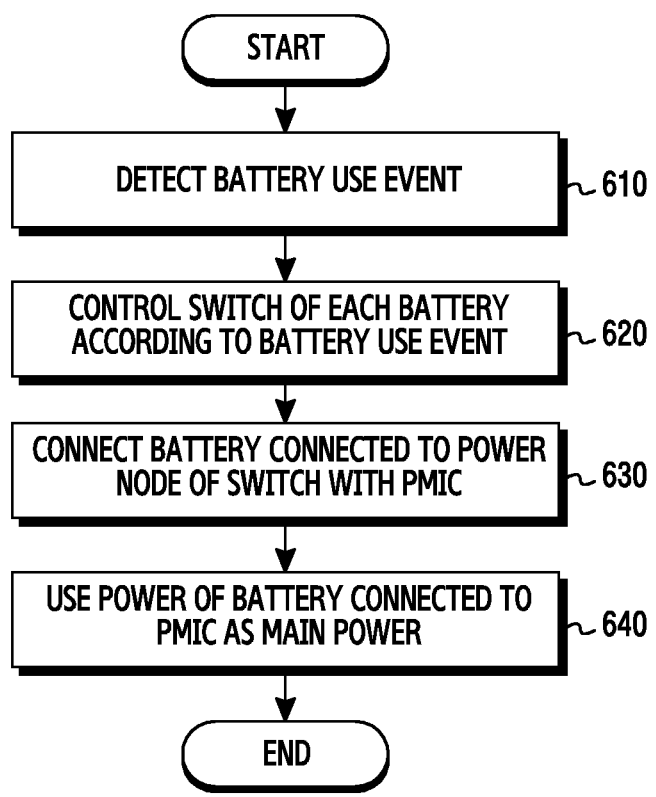
FIG. 6 illustrates a method for controlling a battery use according to various embodiments.

FIG. 6 illustrates a method for controlling a battery use according to various embodiments.

Referring to FIG. 6, in operation 610, the processor 210 may detect a battery use event. The processor 210 may generate the battery use event based on battery information measured in the remaining battery charge measurement circuit 420. Alternatively, the processor 210 may display, on the display 260, a user interface related to a battery use according to a user request, and generate the battery use event according to a selection by the user. For example, the battery use event may be a determination of which battery is to be used as a main power when a total of at least three batteries 411-41N are connected to the electronic device 201 as illustrated in FIG. 4.

In operation 620, the processor 210 may control a switch of each of the batteries according to the battery use event. The processor 210 may control the first switch 461, the second switch 462, and the Nth switch 46N, according to the battery use event. According to various embodiments, the battery use event may be a determination of selecting a battery among multiple batteries 411-41N. The processor 210 may connect a battery among multiple batteries 411-41N to a power node of a switch and connect the remaining batteries to an open node of the switch.

Hereinbelow, TABLE 1 illustrates an example of connecting a node of a switch when a battery is used as a main power of the electric device 201.

TABLE 1

| Switch | SW1 | SW2 | SW3 | ... | SWN |
|---|---|---|---|---|---|
| Case 1 | Vbat | Open | Open | ... | Open |
| Case 2 | Open | Vbat | Open | ... | Open |
| Case 3 | Open | Open | Vbat | ... | Open |
| ... | ... | ... | ... | ... | ... |
| Case N | Open | Open | Open | ... | Vbat |

Referring to TABLE 1, when the battery use event has selected the first battery 411 (case 1), the processor 210 may perform a control such that the first switch (SW1) 461 is connected to the power node (Vbat), and the second switch (SW2) 462 and the Nth switch (SWN) 46N are connected to the open node (Open). When the battery user event has selected the second battery 412 (case 2), the processor 210 may perform a control such that the second switch 462 is connected to the power node, and the first switch 461 and the Nth switch 46N are connected to the open node. When the battery use event has selected the Nth battery 41N (case 3), the processor 210 may perform a control such that the Nth switch (SW3) 46N is connected to the power node, and the first switch 461 and the second switch 462 are connected to the open node.

In operation 630, the processor 210 may connect a battery connected to a power node of the switch with the power management integrated circuit 430. For example, the processor 210 may connect the first battery 411 to the power management integrated circuit 430 when the first battery 411 is connected to the power node. Alternatively, the processor 210 may connect the second battery 412 to the power management integrated circuit 430 when the second battery 412 is connected to the power node. Alternatively, the processor 210 may connect the Nth battery 41N to the power management integrated circuit 430 when the Nth battery 41N is connected to the power node.

In operation 640, the processor 210 may use a battery connected to the power management integrated circuit 430 as a main power. The meaning of using as a main power is to use a battery as a necessary power for driving the electronic device 201. For example, the processor 210 may use the first battery 411 connected to the power management integrated circuit 430 as a main power. Alternatively, the processor 210 may use the second battery 412 connected to the power management integrated circuit 430 as a main power. Alternatively, the processor 210 may use the Nth battery 41N connected to the power management integrated circuit 430 as a main power.

According to various embodiments, the processor 210 may selectively use two or more batteries among multiple batteries 411-41N as a main power of the electronic device 201. Hereinbelow, TABLE 2 illustrates an example of connecting a node of a switch when two or more batteries are used as a main power of the electronic device 201.

TABLE 2

| Switch | SW1 | SW2 | SW3 | ... | SWN |
|---|---|---|---|---|---|
| Case 1 | Vbat | Vbat | Open | ... | Open |
| Case 2 | Open | Vbat | Vbat | ... | Open |
| Case 3 | Vbat | Open | Vbat | ... | Open |

Referring to TABLE 2, when the battery use event has determined to use the first battery 411 and the second battery 412 as a main power (case 1), the processor 210 may perform a control such that the first switch (SW1) 461 and the second switch (SW2) 462 are connected to the power node, and the Nth switch (SWN) 46N is connected to the open node. When the battery use event has determined the second battery 412 and the Nth battery 41N as a main power (case 2), the processor 210 may perform a control such that the second switch 462 and the Nth switch (SW3) 46N are connected to the power node, and the first switch 461 is connected to the open node. When the battery use event has determined to use the first battery 411 and the Nth battery 41N as a main power (case 3), the processor 210 may perform a control such that the first switch 461 and the Nth switch (SW3) 46N are connected to the power node, and the second switch 462 is connected to the open node. In this case, when the power of two batteries connected to the power node is used, the processor 210 may use an equal amount of power from the two batteries, or set a priority order to sequentially use the power of two batteries.

According to various embodiments, the processor 210 may use all of multiple batteries 411-41N as a main power. Hereinbelow, TABLE 3 illustrates an example of controlling a node of a switch when all of multiple batteries are used as a main power of the electronic device 201.

TABLE 3

| Switch | SW1 | SW2 | SW3 | ... | SWN |
|---|---|---|---|---|---|
| Case 1 | Vbat | Vbat | Vbat | ... | Vbat |

Referring to TABLE 3, when the battery use event has determined the first battery 411, the second battery 412, and the Nth battery 41N as a main power, the processor 210 may connect the first switch (SW1) 461, the second switch (SW2) 462, and the Nth switch (SWN) 46N to the power node. In this case, when the power of multiple batteries 411-41N connected to the power node is used, the processor 210 may use an equal amount of power from the multiple batteries, or set a priority order to sequentially use the power of the multiple batteries.

According to various embodiments, the processor 210 may selectively use at least one battery from multiple batteries 411-41N as a main power. Here, when a battery having been used as a main power is discharged, another battery that is not discharged may be used as a main power such that the power of an electronic device is not turned off in order to switch the battery having been used as a main power.

Figure 7:
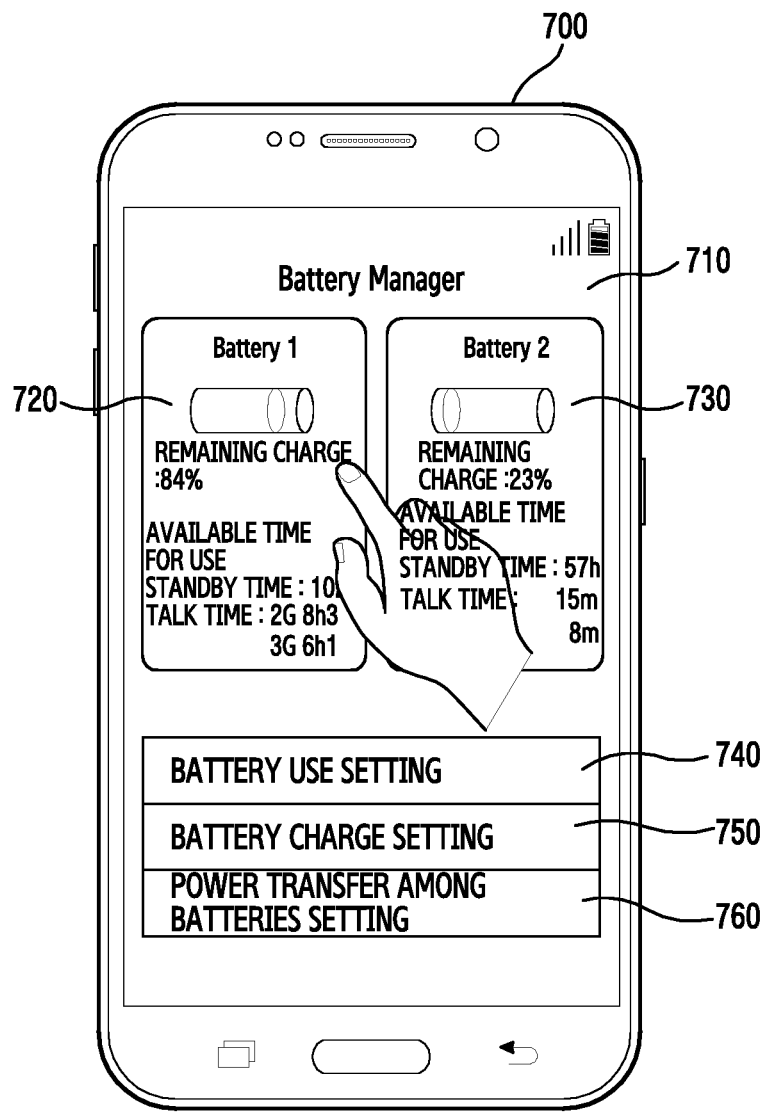
FIG. 7 illustrates a user interface related to a battery use according to various embodiments.

FIG. 7 illustrates a user interface related to a battery use according to various embodiments.

Referring to FIG. 7, the processor 210 may receive an input from a user through an input device 250. Here, a user input may be calling for a battery manager. For example, the user input may be executing an application associated with a battery manager, or selecting a battery management in a setting menu of the electronic device 201. The processor 210 may display, on the display 260, a user interface 710 associated with the battery manager according to a user request. The user interface 710 may include a menu for a battery use setting 740, a battery charging setting 750, and a power transfer setting among batteries 760 in addition to information 720 of the first battery 411, information 730 of the second battery 412. Reference numeral "700" may be the "housing" of an electronic device 410.

Information 720 of the first battery 411 may include the remaining charge (84%) of the first battery 411 and available time for use (standby time: 102H, talk time: 2G-eight H and 3G-six H). Information 730 of the second battery 412 may include the remaining charge (23%) of the second battery 412 and available time for use (standby: 57H, talk time: 2G-15M and 3G-eight M). Here, H means hours, and M means minutes. The user may select, for himself/herself, a battery image related to information 720 of the first battery 411 and information 730 of the second battery 412, and select a battery to be used as a main power of the electronic device 201.

The battery use setting 740 is for setting a battery to be used as a main power of the electronic device 201. The battery to be used as a main power may be one battery, and may be multiple batteries. The battery charging setting 750 is for setting a battery to be charged. For example, a user may select which battery to charge among multiple batteries 411-41N when an external charger is connected to the electronic device 201. A selection for battery charging may be selecting one battery, and may be selecting multiple batteries and setting a priority order such that multiple batteries are sequentially charged. The power transfer setting among batteries 760 performs setting such that an electric charge of a battery among multiple batteries 411-41N is transferred to another battery. That is, the processor 210 may charge power of a battery, using power of another battery.

Figure 8A:
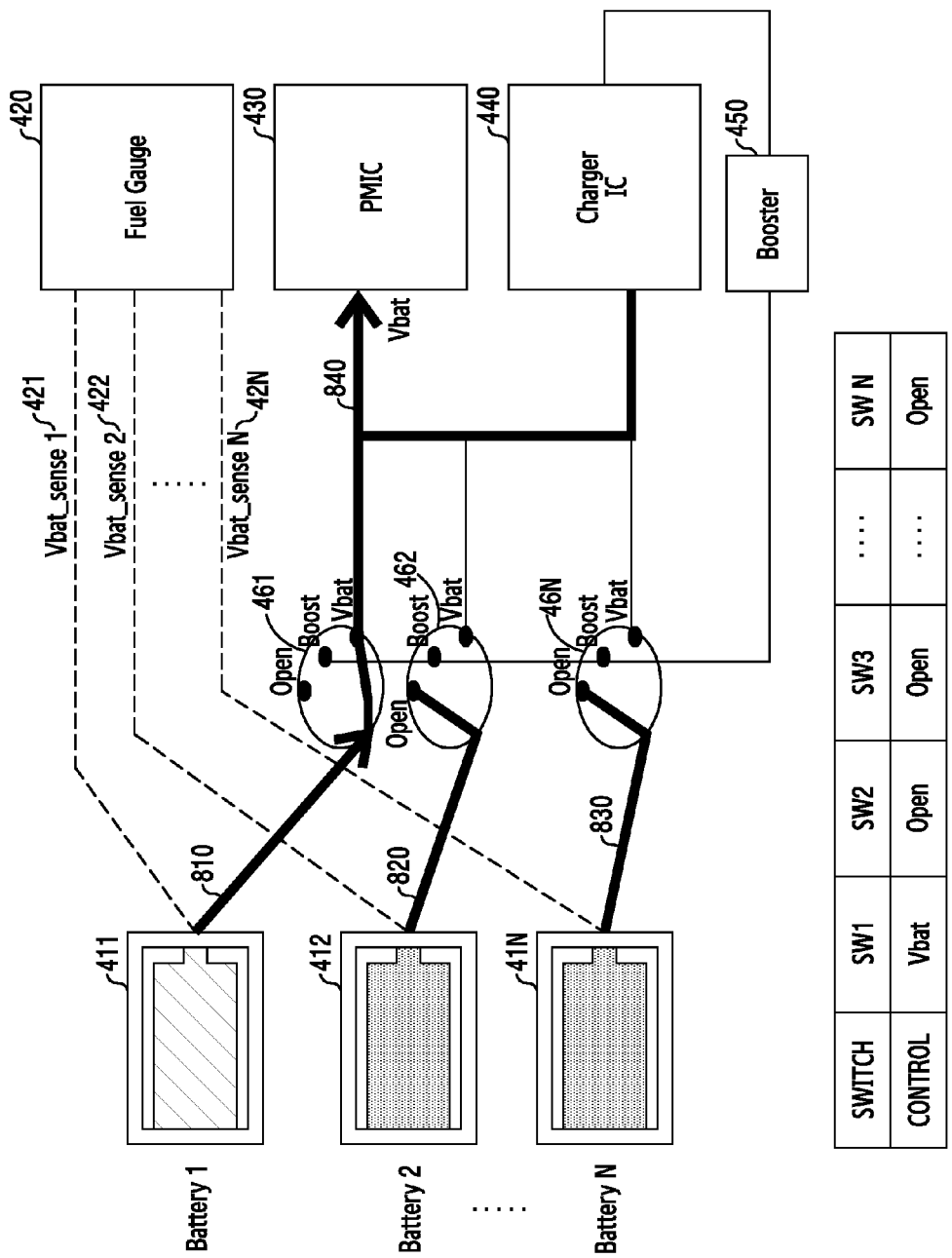
FIG. 8A and FIG. 8B illustrate examples of controlling a switch of each battery for a battery use according to various embodiments.
Figure 8B:
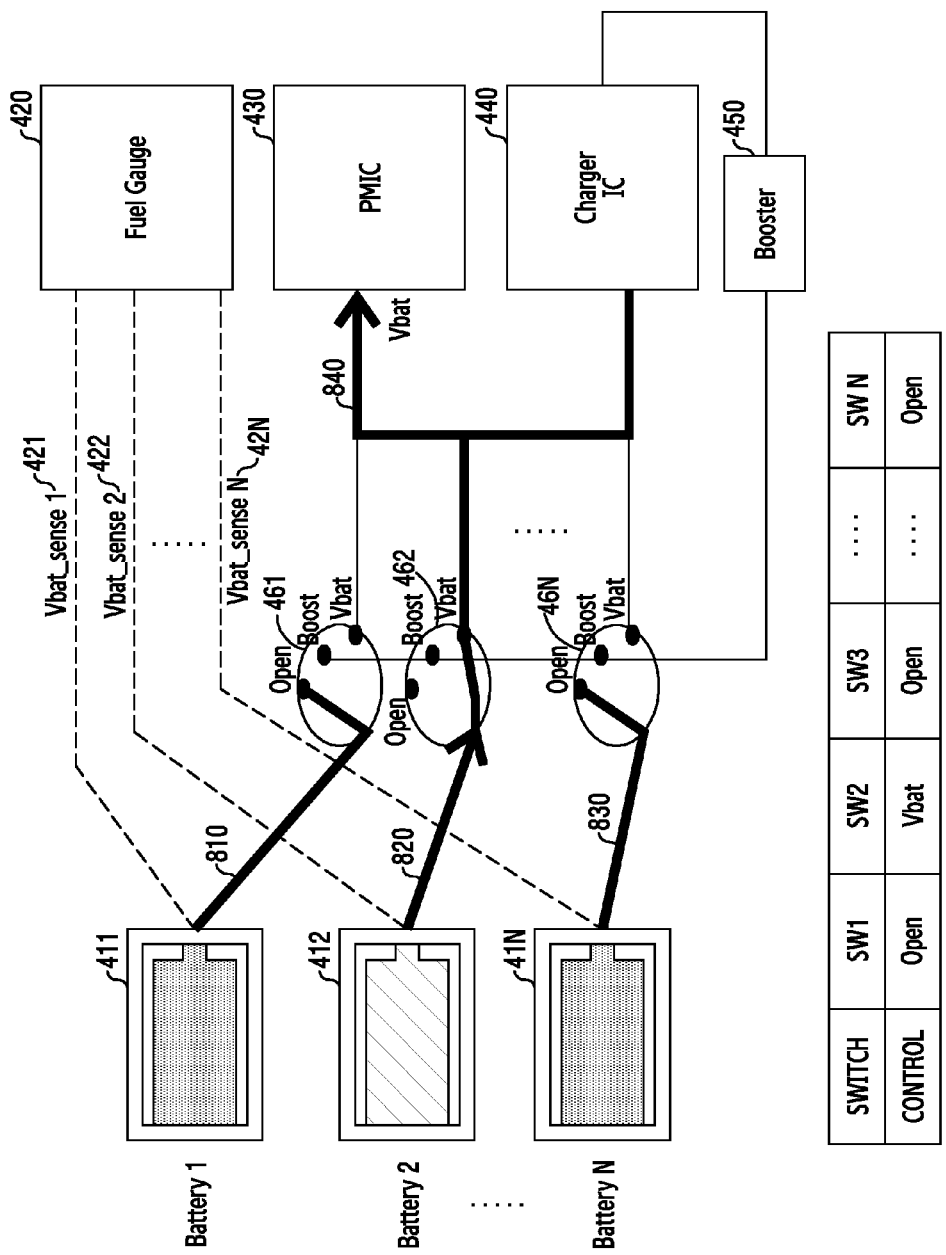

FIG. 8A and FIG. 8B illustrate examples of controlling a switch of each battery for a battery use according to various embodiments.

FIG. 8A illustrates an example of using the first battery 411 among multiple batteries 411-41N as a main power. Referring to FIG. 8A and TABLE 1, the processor 210 may connect the first switch 461 to the power node (Vbat) and form an electrical route 810. The processor 210 may control the second switch 462 and the Nth switch 46N to be connected to the open node (Open). In this case, the second battery 412 may form an open circuit and an electrical route 820, and the Nth battery 41N may form an open circuit and an electrical route 830. The first power of the first battery 411 may be transmitted to the power management integrated circuit 430 through an electrical route 840.

FIG. 8B illustrates an example of using the second battery 412 among multiple batteries 411-41N as a main power of the electronic device 201. Referring to FIG. 8B and TABLE 1, the processor 210 may connect the second switch 462 to the power node (Vbat) and form the electrical route 820. The processor 210 may control the first switch 461 and the Nth switch 46N to be connected to the open node (Open). In this case, the first battery 411 may form an open circuit and the electrical route 810, and the Nth battery 41N may form an open circuit and the electrical route 830. In this case, the second power of the second battery 412 may be transmitted to the power management integrated circuit 430 through the electrical route 840.

Figure 9:
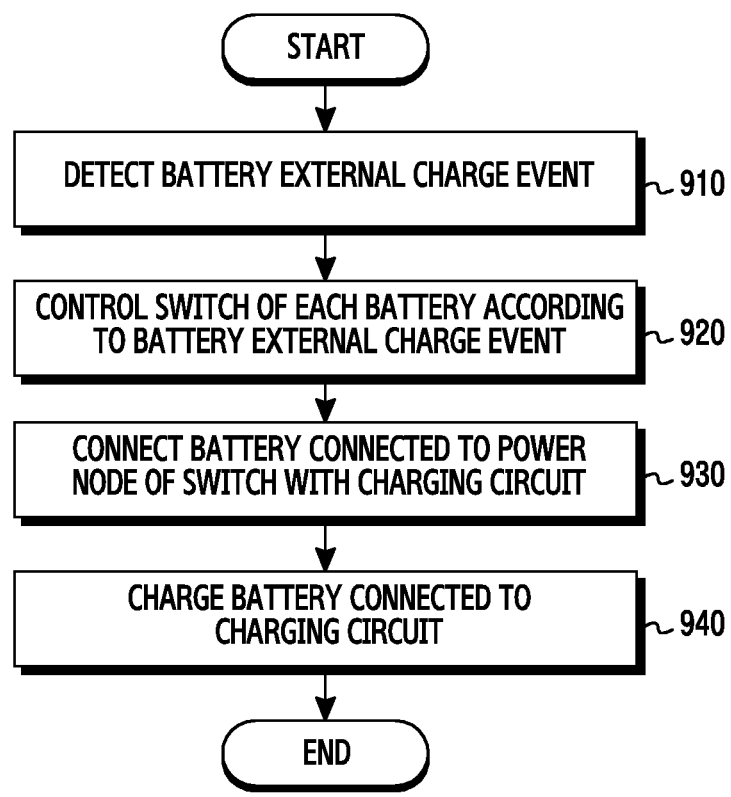
FIG. 9 illustrates a method for controlling an external charge of a battery according to various embodiments.

FIG. 9 illustrates a method for controlling an external charge of a battery according to various embodiments. Referring to FIG. 9, the processor 210 may detect a battery external charge event in operation 910. For example, the battery external charge event may be a case where an external device is a charger (480 of FIG. 10). The processor 210 may determine whether the charger 480 is connected to the charging circuit 440 so as to detect the battery external charge event. The processor 210 may determine, periodically or in the real-time, whether the charger 480 is connected to the charger IC 440. Alternatively, when a user request is present, the processor 210 may determine whether the charger 480 is connected to the charger IC 440. For example, the processor 210 may display, on the display 260, a user interface associated with battery charging according to a user request, and search for whether the charger 480 is connected when an external charge within the user interface is selected. When the charger 480 is connected, the processor 210 may determine that the battery external charge event has occurred.

In operation 920, the processor 210 may control a switch of each of batteries according to the battery external charge event. The processor 210 may control the first switch 461, the second switch 462, and the Nth switch 46N according to the battery external charge event. According to various embodiments, the processor 210 may select a battery to be charged based on battery information measured by the remaining battery charge measurement circuit 420. For example, the processor 210 may select a battery among multiple batteries 411-41N based on the battery information. Alternatively, when the battery external charge event occurs by a user request, the processor 210 may receive a selected battery to be charged from the user. The processor 210 may connect a battery among multiple batteries 411-41N to a power node of a switch, and connect the remaining batteries to an open node of the switch.

Referring to TABLE 1, when the battery external charge event has selected the first battery 411, the processor 210 may perform a control such that the first switch (SW1) 461 is connected to the power node (Vbat), and the second switch (SW2) 462 and the Nth switch (SWN) 46N are connected to the open node (Open). When the battery external charge event has selected the second battery 412, the processor 210 may perform a control such that the second switch 462 is connected to the power node, and the first switch 461 and the Nth switch 46N are connected to the open node. When the battery external charge event has selected the Nth battery 41N, the processor 210 may perform a control such that the Nth switch 46N is connected to the power node, and the first switch 461 and the second switch 462 are connected to the open node.

According to various embodiments, the processor 210 may select two or more batteries among multiple batteries 411-41N, based on the battery information. Alternatively, when the battery external charge event occurs by a user request, the processor 210 may receive two or more selected batteries to be charged from the user. In this case, when two batteries connected to the power node are charged, the processor 210 may use an equal amount of power for charging, or set a priority order to sequentially charge two batteries.

According to various embodiments, the processor 210 may charge all of multiple batteries 411-41N. In this case, the processor 210 may use an equal amount of power to charge batteries 411-41N connected to the power node, or set a priority order to sequentially charge the batteries. For example, the processor 210 may charge the first battery 411 first, charge the second battery 412 when the first battery 411 is completely charged, and charge the Nth battery 41N when the second battery 412 is completely charged. The meaning of "completely charged" may be that the charging capacity of the first battery 411 is full (100%) or may be that a predetermined charging capacity (e.g., 50%) is determined to be satisfied.

In operation 930, the processor 210 may connect a battery connected to the power node of the switch with the charging circuit 440. For example, the processor 210 may connect the first battery 411 to the charging circuit 440 when the first battery 411 is connected to the power node. Alternatively, the processor 210 may connect the second battery 412 to the charging circuit 440 when the second battery 412 is connected to the power node. Alternatively, the processor 210 may connect the Nth battery 41N to the charging circuit 440 when the Nth battery 41N is connected to the power node.

In operation 940, the processor 210 may charge a battery connected to the charging circuit 440. The processor 210 may transmit power of the charger 480 to a battery connected to the charging circuit 440. For example, when the first battery 411 is connected to the charging circuit 440, the processor 210 may transmit power of the charger 480 to the first battery 411. When the second battery 412 is connected to the charging circuit 440, the processor 210 may transmit power of the charger 480 to the second battery 412. When the Nth battery 41N is connected to the charging circuit 440, the processor 210 may transmit power of the charger 480 to the Nth battery 41N.

Figure 10:
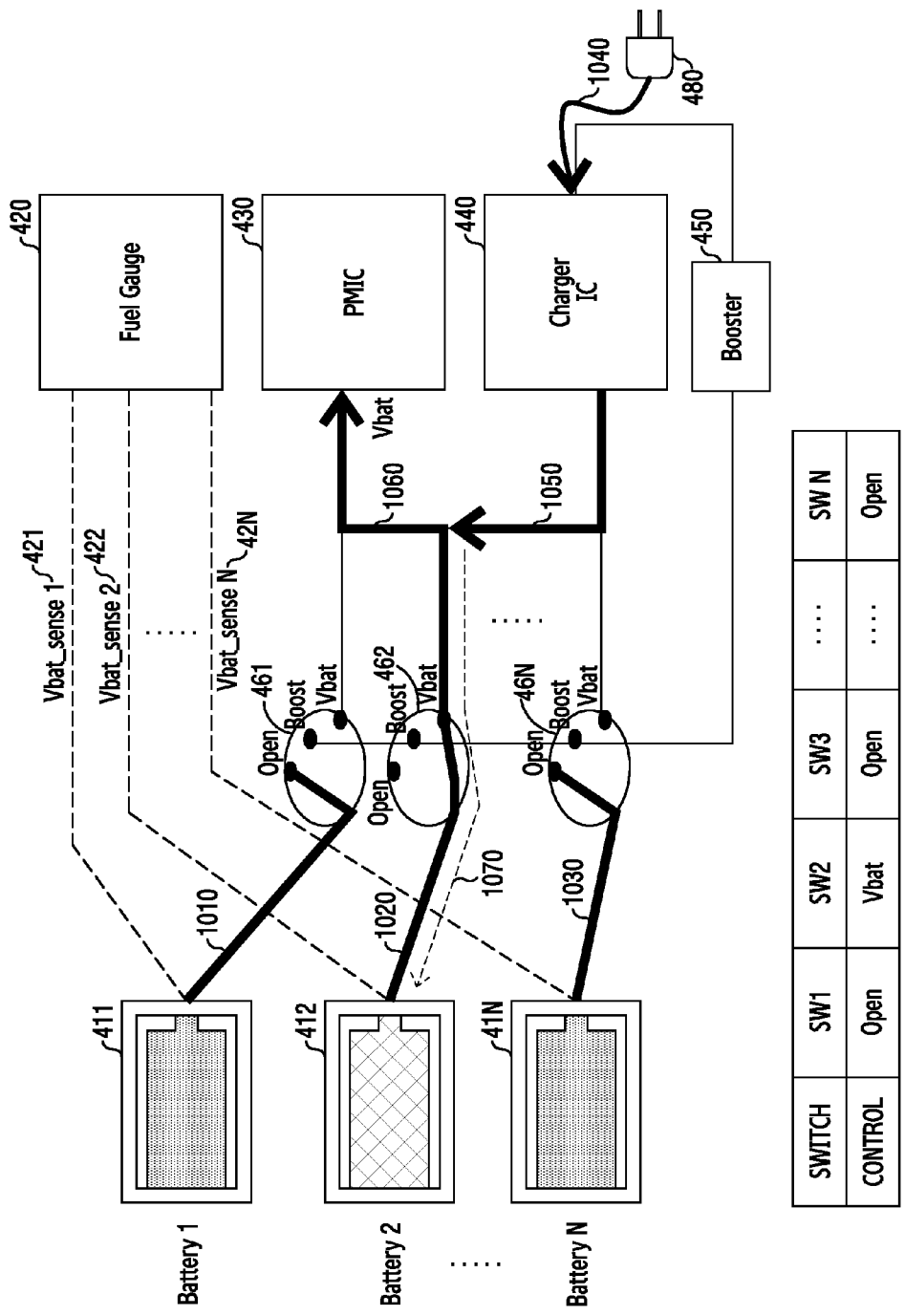
FIG. 10 illustrates a switch of each battery for an external charge of the battery according to various embodiments.

FIG. 10 illustrates a switch of each battery for an external charge of the battery according to various embodiments.

Referring to FIG. 10, the processor 210 may charge the second battery 412 among multiple batteries 411-41N. The processor 210 may perform a control such that the first switch 461 is connected to the open node (Open) to form an electrical route 1010, the second switch 462 is connected to the power node (Vbat) to form an electrical route 1020, and the Nth switch 46N is connected to the open node (Open) to form an electrical route 1030. The second battery 412 may be connected to the power management integrated circuit 430 and the charging circuit 440. In this case, the processor 210 may receive, from the charger 480, power through an electrical route 1040, and transmit the power received through the charging circuit 440 to the second switch 462 through an electrical route 1050, and to the power management integrated circuit 430 through an electrical route 1060. In addition, power of the charger 480 may charge the second battery 412 through an electrical route 1070. For reference, the electrical route 1020 and the electrical route 1070 may be the same route, differing only in the direction of current flow.

Figure 11:
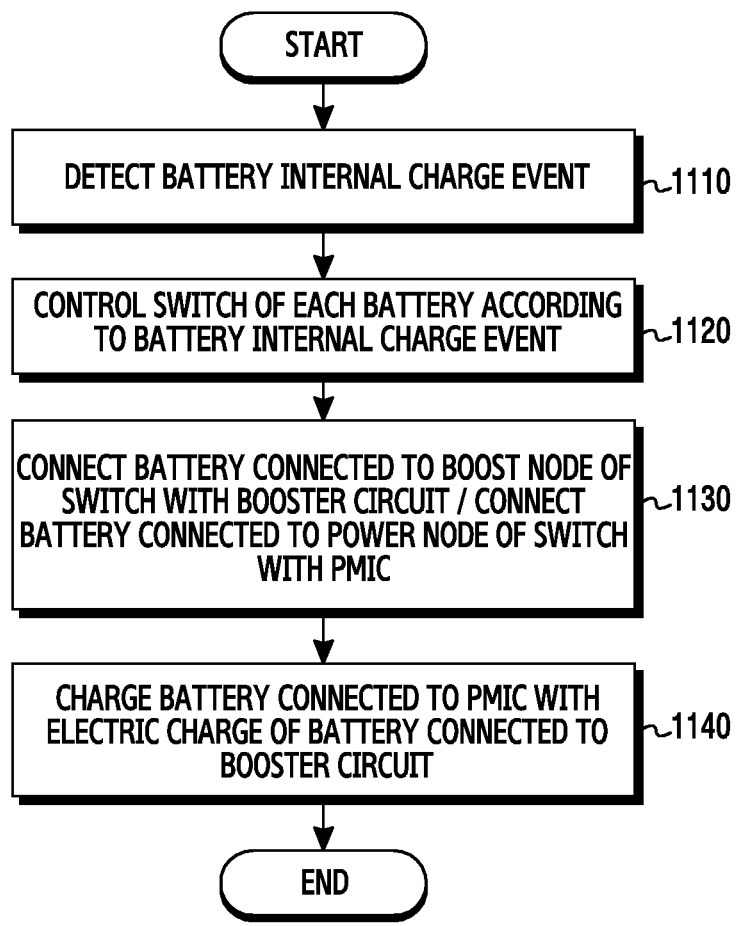
FIG. 11 illustrates a method for controlling an electric charge transfer among batteries according to various embodiments.

FIG. 11 illustrates a method for controlling an electric charge transfer among batteries according to various embodiments.

Referring to FIG. 11, the processor 210 may detect a battery internal charge event in operation 1110. The processor 210 may generate the battery internal charge event, based on battery information measured in the remaining battery charge measurement circuit 420. The battery internal charge event may be a determination of whether to transfer power of a battery among multiple batteries 411-41N connected to the electronic device 201 to another battery. For example, the processor 210 may generate the battery internal charge event when power of a battery is less than a predetermined charging capacity (e.g., 30%) based on the battery information. Alternatively, the processor 210 may display, on the display 260, a user interface related to battery charging according to a request by a user, and generate the battery internal charge event according to a selection by the user.

In operation 1120, the processor 210 may control a switch of each battery according to the battery internal charge event. The processor 210 may control the first switch 461, the second switch 462, and the Nth switch 46N according to the battery internal charge event. According to various embodiments, the processor 210 may connect a battery among multiple batteries 411-41N to a boost node of a switch, connect another battery to a power node of a switch, and remaining batteries to an open node of a switch.

Hereinbelow, TABLE 4 illustrates an example of connecting nodes of a switch in case of transferring an electric charge among batteries.

TABLE 4

| Switch | SW1 | SW2 | SW3 | . . . | SWN |
|---|---|---|---|---|---|
| Case 1 | Vbat | Boost | Open | . . . | Open |
| Case 2 | Open | Vbat | Boost | . . . | Open |
| Case 3 | Boost | Open | Vbat | . . . | Open |
| Case 4 | Vbat | Open | Boost | . . . | Open |
| Case 5 | Open | Boost | Vbat | . . . | Open |
| Case 6 | Boost | Vbat | Open | . . . | Open |

Referring to TABLE 4, in case 1, the processor 210 may perform a control such that the first switch (SW1) 461 is connected to the power node (Vbat), the second switch (SW2) 462 is connected to the boost node (Boost), and the Nth switch (SW3) 46N is connected to the open node (Open). Alternatively, in case 2, the processor 210 may perform a control such that the first switch 461 is connected to the open node, the second switch 462 is connected to the power node, and the Nth switch (SW3) 46N is connected to the boost node. Alternatively, in case 3, the processor 210 may perform a control such that the first switch 461 is connected to the boost node, the second switch 462 is connected to the open node, and the Nth switch (SW3) 46N is connected to the power node.

Alternatively, in case 4, the processor 210 may perform a control such that the first switch (SW1) 461 is connected to the power node (Vbat), the second switch (SW2) 462 is connected to the open node, and the Nth switch (SW3) 46N is connected to the boost node. Alternatively, in case 5, the processor 210 may perform a control such that the first switch 461 is connected to the open node, the second switch 462 is connected to the boost node, and the Nth switch (SW3) 46N is connected to the power node. Alternatively, in case 6, the processor 210 may perform a control such that the first switch 461 is connected to the boost node, the second switch 462 is connected to the power node, and the Nth switch (SW3) 46N is connected to the open node.

In operation 1130, the processor 210 may electrically connect a battery connected to the boost node of the switch with the booster circuit 450 and the charger IC 440, and electrically connect a battery connected to the power node of the switch with the power management integrated circuit 430 and the charger IC 440. Referring to TABLE 4, the processor 210 may connect the first battery 411 connected to the power node with the power management integrated circuit 430 and the charger IC 440, the second battery 412 connected to the boost node with the booster circuit 450 and the charger IC 440, and the Nth battery 41N connected to the open node with the open circuit. The processor 210 may connect the first battery 411 connected to the open node with the open circuit, the second battery 412 connected to the power node with the power management integrated circuit 430 and the charger IC 440, and the Nth battery 41N connected to the boost node with the booster circuit 450 and the charger IC 440. The processor 210 may connect the first battery 411 connected to the boost node with the booster circuit 450 and the charger IC 440, the second battery 412 connected to the open node with the open circuit, and the Nth battery 41N connected to the power node with the power management integrated circuit 430 and the charger IC 440.

In operation 1140, the processor 210 may charge a battery connected to the power management integrated circuit 430, using an electric charge of a battery connected to the booster circuit 450. Referring to TABLE 4, the processor 210 may boost the second voltage of the second battery 412 connected to the booster circuit 450 and transmit the same to the first battery 411 connected to the power management integrated circuit 430. The processor 210 may boost the Nth voltage of the Nth battery 41N connected to the booster circuit 450, and transmit the same to the second battery 412 connected to the power management integrated circuit 430. The processor 210 may boost the first voltage of the first battery 411 connected to the booster circuit 450 and transmit the same to the Nth battery 41N connected to the power management integrated circuit 430.

The current flow of the electronic device 201 is like the flow of water and has the attribute of flowing from a high place to a low place. Therefore, in the present disclosure, the booster circuit 450 is used to enable current to flow regardless the high and low of voltage. The booster circuit 450 functions to change a battery voltage to a high voltage sufficient enough to charge using another battery. Therefore, although power of the first battery 411 is lower than power of the second battery 412, if the first voltage of the first battery 411 is boosted, charge power of the second battery 412 may be charged using power of the first battery 411.

According to various embodiments, the processor 210 may transfer electric charges of two or more batteries among multiple batteries 411-41N to another battery. In this case, the processor 210 may connect, to the boost node, switches of batteries having electric charges to be transferred, connect a switch of another battery to the power node, and connect remaining batteries to the open node. The processor 210 may transfer, from the batteries having electric charges to be transferred, an equal amount of electric charges, or a different amount of electric charges according to the full capacity of the battery, the remaining capacity of the battery, a user setting, or a priority order.

Alternatively, the processor 210 may transfer an electric charge of a battery among multiple batteries 411-41N to the other two batteries. In this case, the processor 210 may connect a switch of a battery having an electric charge to be transferred to the boost node, connect switches of batteries to be charged with electric charges to the power node, and connect the remaining batteries to the open node. The processor 210 may transfer, to two or more batteries, an equal amount of electric charges, or a different amount of electric charges according the full capacity of each battery, the remaining capacity of each battery, a user setting, or a priority order.

Figure 12A:
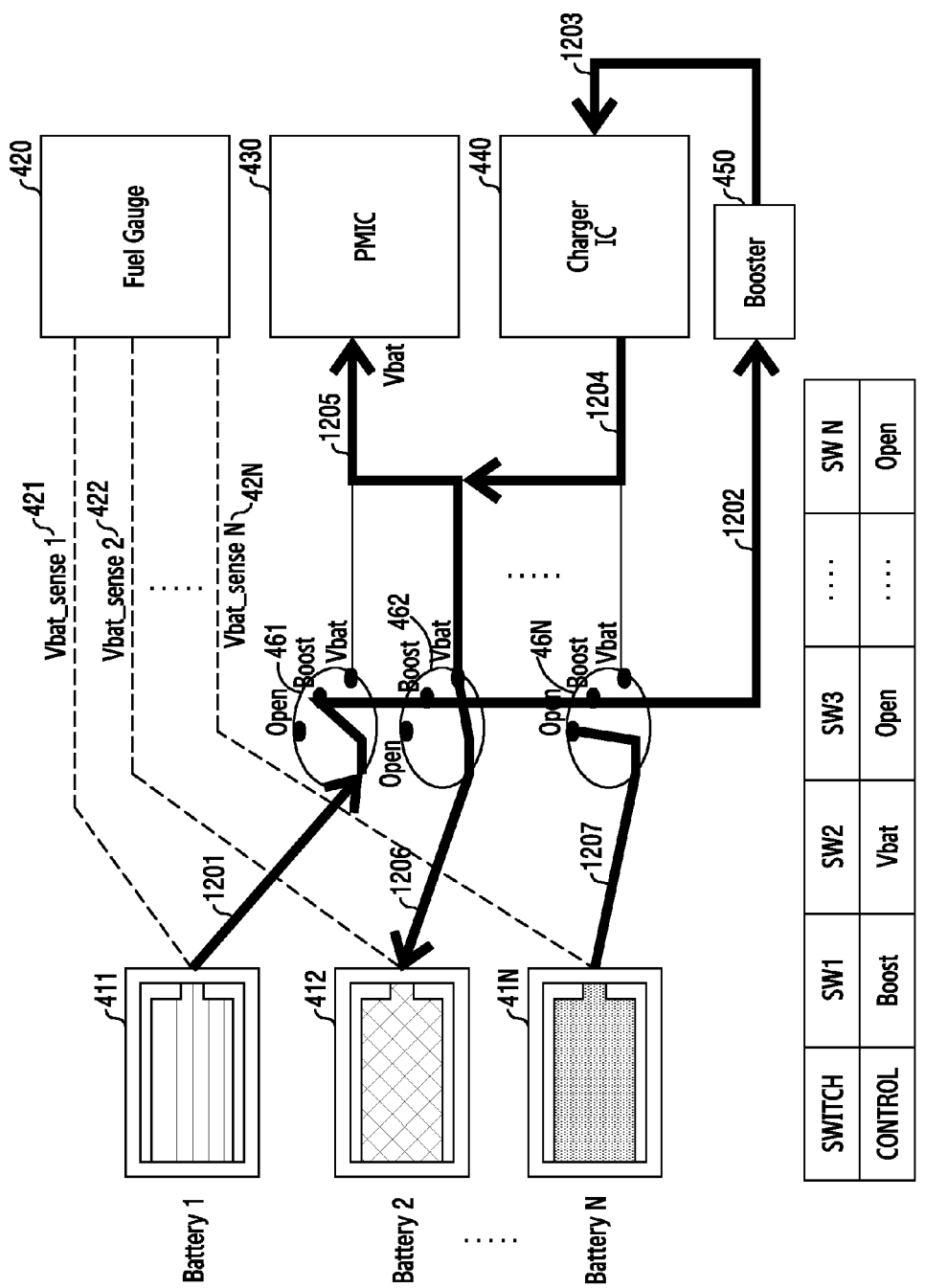
FIG. 12A and FIG. 12B illustrate examples of controlling a switch of each battery, for an electric charge transfer among batteries according to various embodiments.
Figure 12B:
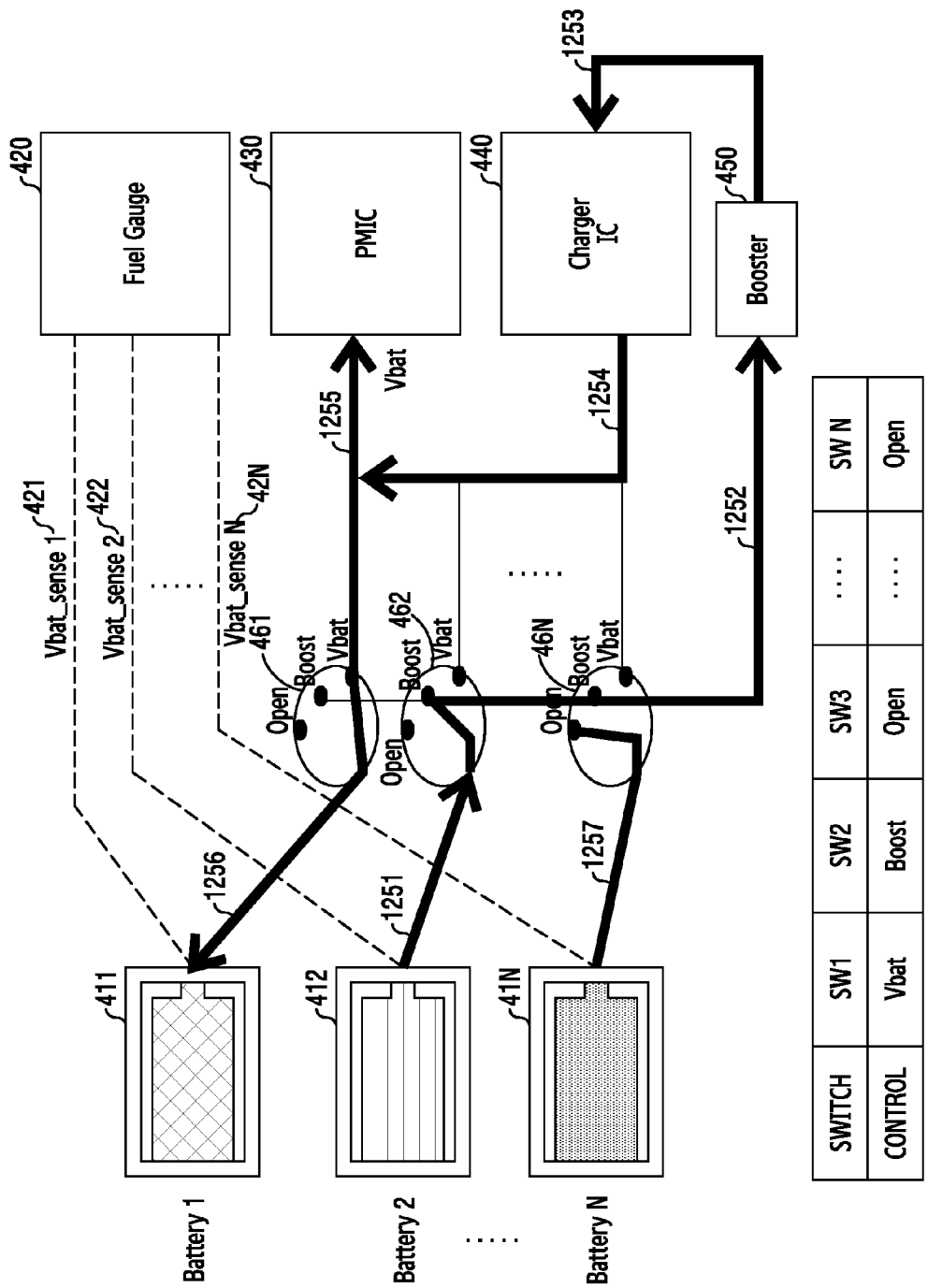

FIG. 12A and FIG. 12B illustrate examples of controlling a switch of each battery, for an electric charge transfer among batteries according to various embodiments.

FIG. 12A illustrates an example of charging the second battery 412, using the first power of the first battery 411. Referring to FIG. 12A and TABLE 4 (case 6), the processor 210 may connect the first battery 411 to the boost node to form an electrical route 1201, connect the second battery 412 to the power node to form an electrical route 1206, and connect the Nth battery 41N to the open node to form an electrical route 1207. A first electric charge of the first battery 411 may be transferred to the booster circuit 450 along an electrical route 1202. The first power of the first battery 411 having voltage boosted in the booster circuit 450 may be transmitted to the charging circuit 440 along an electrical route 1203. The voltage-boosted first power in the charger IC 440 may be transmitted to the second switch 462 along an electrical route 1204, and transmitted to the power management integrated circuit 430 along an electrical route 1205. The second battery 412 may be charged with the power received along the electrical route 1206.

FIG. 12B illustrates an example of charging the first battery 411, using the second power of the second battery 412. Referring to FIG. 12B and TABLE 4 (case 1), the processor 210 may connect the first battery 411 to the power node to form an electrical route 1256, connect the second battery 412 to the boost node to form an electrical route 1251, and connect the Nth battery 41N to the open node to form an electrical route 1257. A second electric charge of the second battery 412 may be transferred to the booster circuit 450 along an electrical route 1252. The second power of the second battery 412 having voltage boosted in the booster circuit 450 may be transmitted to the charger IC 440 along an electrical route 1253. The second power passed through the charger IC 440 may be transmitted to the first switch 461 along an electrical route 1254, and may be transmitted to the power management integrated circuit 430 along an electrical route 1255. The first battery 411 may be charged with the power received along the electrical route 1256.

Figure 13:
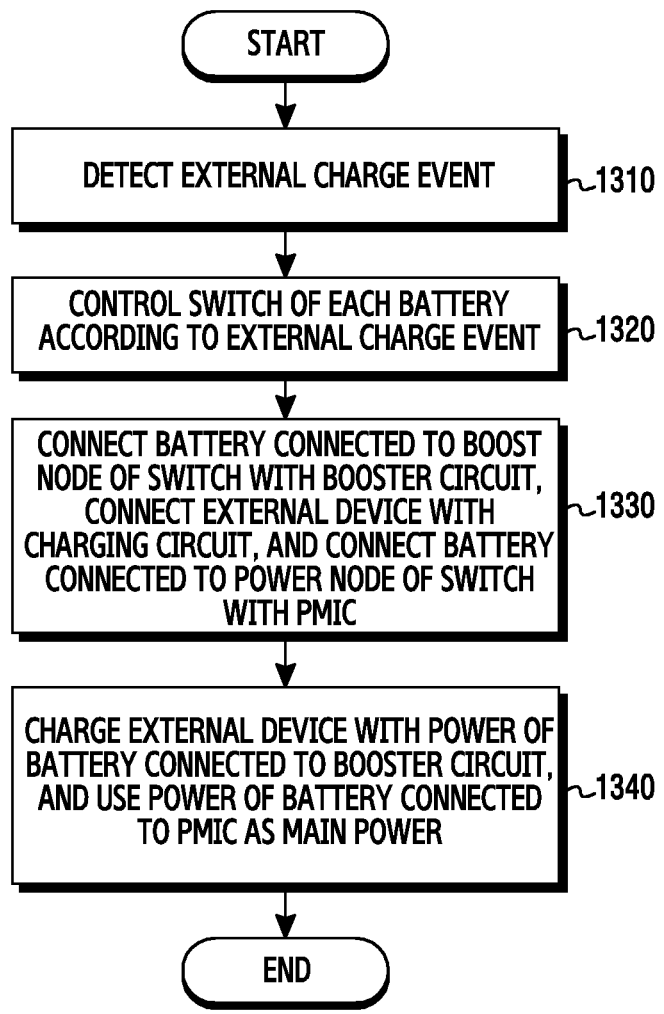
FIG. 13 illustrates a method for controlling a switch of each battery, for charging an external device according to various embodiments.

FIG. 13 illustrates a method for controlling a switch of each battery for charging an external device according to various embodiments.

Referring to FIG. 13, the processor 210 may detect an external charge event in operation 1310. For example, the external charge event may be a case where the external device 470 is not a charger and is another electronic device (e.g., a wearable device). The processor 210 may determine whether the external device 470 is connected to the charger IC 440 so as to detect the external charge event. The processor 210 may determine, periodically or in the real-time, whether the external device 470 is connected to the charger IC 440. Alternatively, when a user request is present, the processor 210 may determine whether the external device 470 is connected to the charger IC 440. For example, the processor 210 may display, on the display 260, a user interface related to battery charging according to a user request, and search for whether the external device 470 is connected when an external charge within the user interface is selected. When the external device 470 is connected, the processor 210 may determine that the external charge event has occurred.

In operation 1320, the processor 210 may control a switch of each of batteries according to the external charge event. The processor 210 may control the first switch 461, the second switch 462, and the Nth switch 46N according to the external charge event. According to various embodiments, the processor 210 may select a battery to be charged to the external device 470, based on battery information measured by the remaining battery charge measurement circuit 420. For example, the processor 210 may select a battery among multiple batteries 411-41N based on the battery information. Alternatively, when the external charge event occurs by a user request, the processor 210 may receive a selected battery to be charged to the external device 470. The processor 210 may connect a battery among multiple batteries 411-41N to a boost node of a switch, connect an external control switch 471 to an external charge node, connect another battery to a power node of a switch, and connect the remaining batteries to an open node of a switch.

Hereinbelow, TABLE 5 illustrates an example of connecting nodes of a switch at the time of charging to an external device.

TABLE 5

| Switch | SW1 | SW2 | SW3 | ... | SWN | SW_Ext |
|---|---|---|---|---|---|---|
| Case 1 | Vbat | Boost | Open | ... | Open | V_Ext |
| Case 2 | Open | Vbat | Boost | ... | Open | V_Ext |
| Case 3 | Boost | Open | Vbat | ... | Open | V_Ext |
| Case 4 | Vbat | Open | Boost | ... | Open | V_Ext |
| Case 5 | Open | Boost | Vbat | ... | Open | V_Ext |
| Case 6 | Boost | Vbat | Open | ... | Open | V_Ext |

Referring to TABLE 5, in case 1, the processor 210 may perform a control such that the first switch (SW1) 461 is connected to the power node (Vbat), the second switch 462, SWITCH 2 is connected to the boost node (Boost), the external control switch (SW_Ext) 471 is connected to the external charge node (V_Ext), and the Nth switch (SW3) 46N is connected to the open node (Open). Alternatively, in case 2, the processor 210 may perform a control such that the first switch 461 is connected to the open node, the second switch 462 is connected to the power node, the Nth switch (SW3) 46N is connected to the boost node, and the external control switch 471 is connected to the external charge node. Alternatively, in case 3, the processor 210 may perform a control such that the first switch 461 is connected to the boost node, the external control switch 471 is connected to the external charge node, the second switch 462 is connected to the open node, and the Nth switch (SW3) 46N is connected to the power node.

Alternatively, in case 4, the processor 210 may perform a control such that the first switch (SW1) 461 is connected to the power node (Vbat), the second switch (SW2) 462 is connected to the open node, the Nth switch (SW3) 64N is connected to the boost node, and the external control switch 471 is connected to the external charge node. Alternatively, in case 5, the processor 210 may perform a control such that the first switch 461 is connected to the open node, the second switch 462 is connected to the boost node, the external control switch 471 is connected to the external charge node, and the Nth switch (SW3) 46N is connected to the power node. Alternatively, in case 6, the processor 210 may perform a control such that the first switch 461 is connected to the boost node, the external control switch 471 is connected to the external charge node, the second switch 462 is connected to the power node, and the Nth switch (SW3) 46N is connected to the open node.

In operation 1330, the processor 210 may electrically connect the battery connected to the boost node of the switch and the booster circuit 450, electrically connect the external device 470 connected to the external charge node of the switch and the charger IC 440, and electrically connect the battery connected to the power node of the switch and the power management integrated circuit 430. Referring to TABLE 5, the processor 210 may connect the first battery 411 connected to the power node with the power management integrated circuit 430, connect the second battery 412 connected to the boost node with the booster circuit 450, connect the external device 470 to the charger IC 440, and connect the Nth battery 41N connected to the open node with the open circuit. The processor 210 may connect the first battery 411 connected to the open node with the open circuit, connect the second battery 412 connected to the power node with the power management integrated circuit 430, connect the Nth battery 41N connected to the boost node with the booster circuit 450, and connect the external device 470 to the charger IC 440. The processor 210 may connect the first battery 411 connected to the boost node with the booster circuit 450, connect the external device 470 to the charger IC 440, connect the second battery 412 connected to the open node with the open circuit, and the Nth battery 41N connected to the power node to the power management integrated circuit 430.

In operation 1340, the processor 210 may transfer an electric charge of the battery connected to the booster circuit 450 to the external device 470 through the charger IC 440, and use power of the battery connected to the power management integrated circuit 430 as a main power. Referring to TABLE 5, the processor 210 may boost the second voltage of the second battery 412 connected to the booster circuit 450 to transmit, through the charger IC 440, the boosted voltage to the external device 470, and use the first power of the first battery 411 connected to the power management integrated circuit 430 as a main power of the electronic device 201. The processor 210 may boost the Nth voltage of the Nth battery 41N connected to the booster circuit 450 to transmit, through the charger IC 440, the boosted voltage to the external device 470, and use the second power of the second battery 412 connected to the power management integrated circuit 430 as a main power of the electronic device 201. The processor 210 may boost the first voltage of the first battery 411 connected to the booster circuit 450 to transmit, through the charger IC 440, the boosted voltage to the external device 470, and use the Nth power of the Nth battery 41N connected to the power management integrated circuit 430 as a main power of the electronic device 201.

Figure 14A:
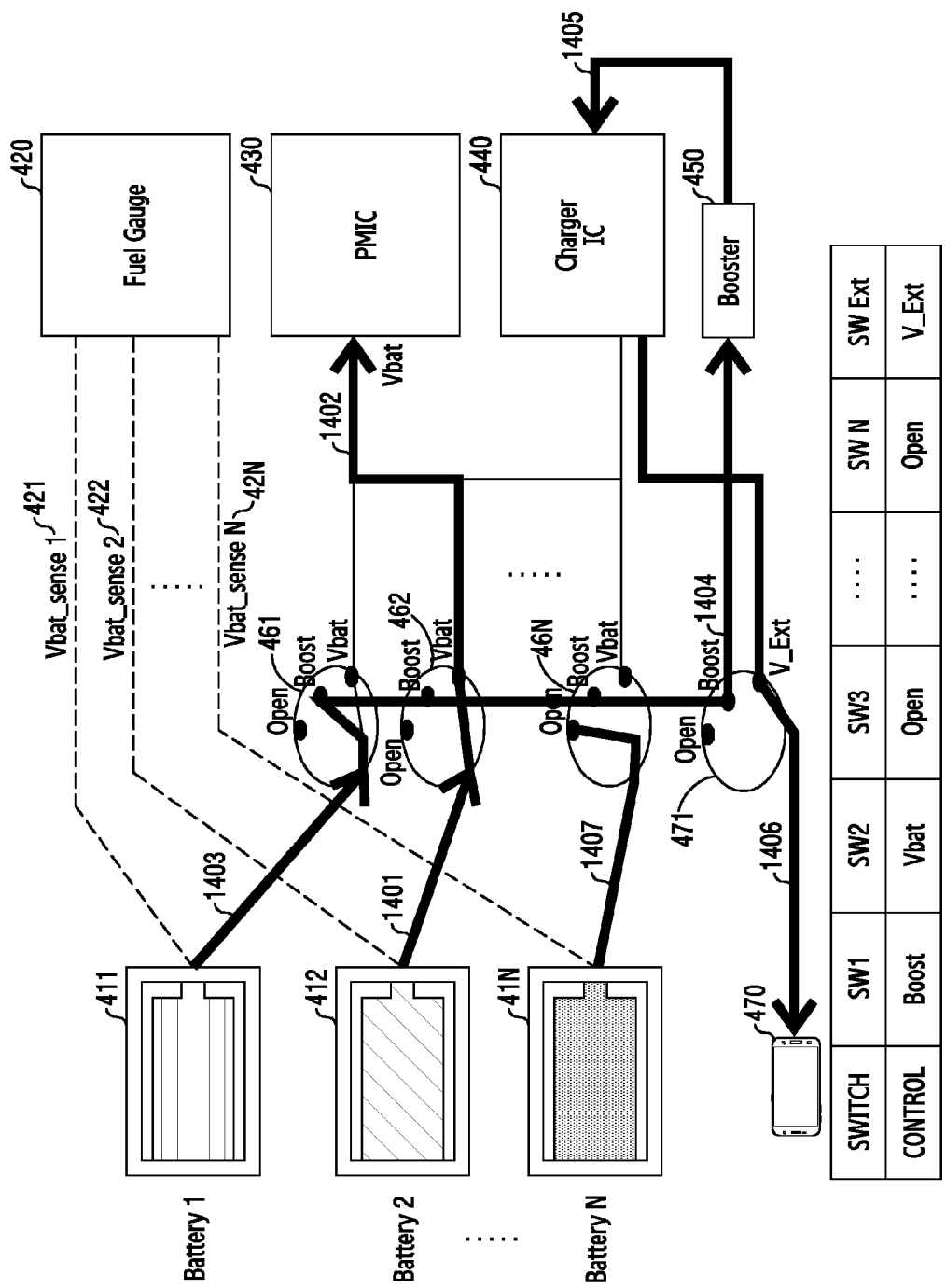
FIG. 14A and FIG. 14B illustrate examples of controlling a switch of each battery, for charging an external device according to various embodiments.
Figure 14B:
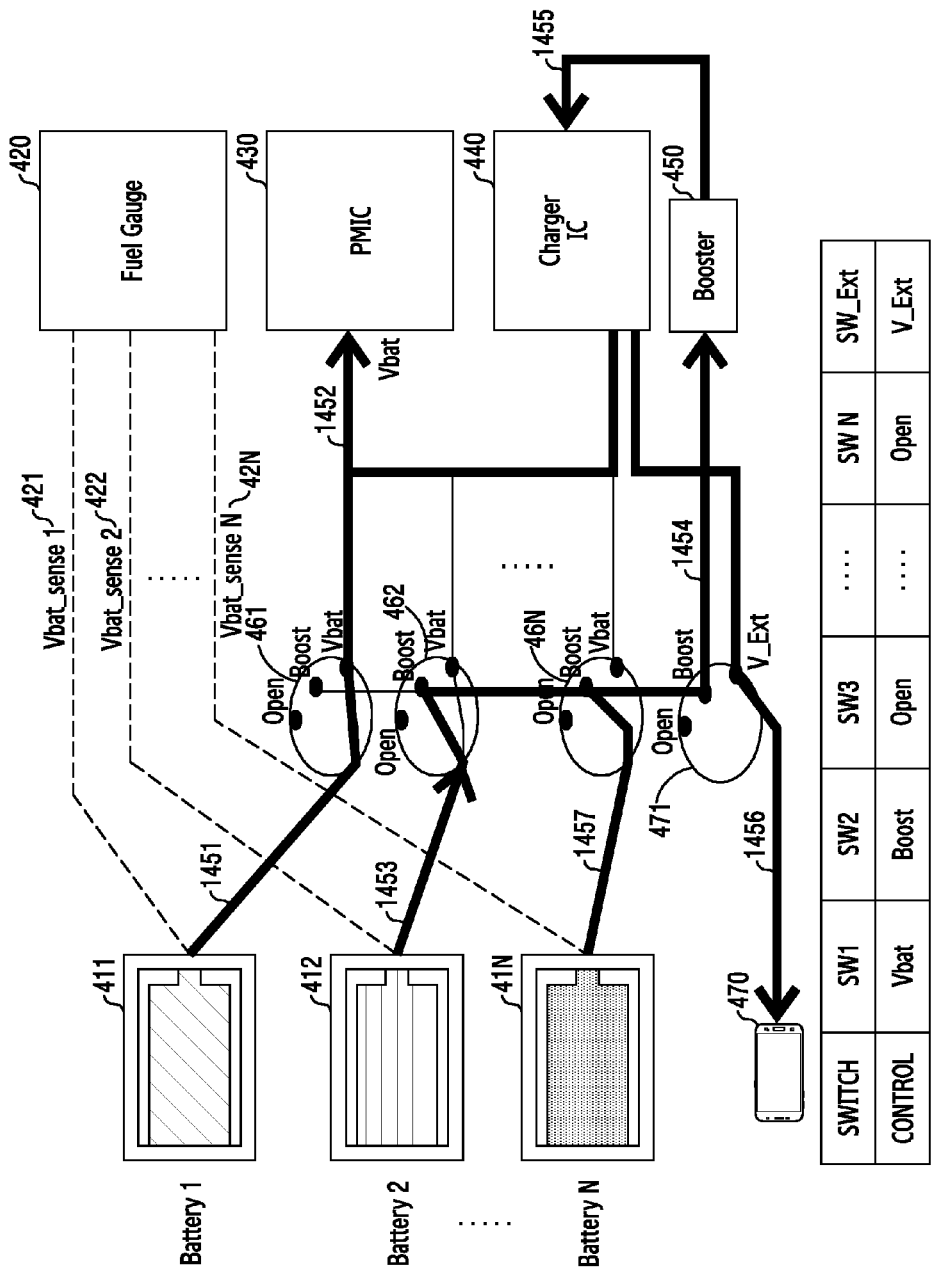

FIG. 14A and FIG. 14B illustrate examples of controlling a switch of each battery, for charging an external device according to various embodiments.

FIG. 14A illustrates an example of transmitting the first power of the first battery 411 to the external device 470, and using the second power of the second battery 412 as a main power of the electronic device 201. Referring to FIG. 14A and TABLE 5 (case 6), the processor 210 may connect the first battery 411 to the boost node to form an electrical route 1403, connect the external device 470 to the external charge node, connect the second battery 412 to the power node to form an electrical route 1401, and connect the Nth battery 41N to the open node to form an electrical route 1407. The second power of the second battery 412 may be transmitted to the power management integrated circuit 430 along an electrical route 1402. That is, the processor 210 may drive the electronic device 201 using the second power of the second battery 412. The first electric charge of the first battery 411 may be transferred to the booster circuit 450 along an electrical route 1404. The first power of the first battery 411 having voltage boosted in the booster circuit 450 may be transmitted to the charger IC 440 along an electrical route 1405. In the charger IC 440, the voltage-boosted first power may be transmitted to the external device 470 along an electrical route 1406.

FIG. 14B illustrates an example of transmitting the second power of the second battery 412 to the external device 470, and using the first power of the first battery 411 as a main power of the electronic device 201. Referring to FIG. 14B and TABLE 5 (case 1), the processor 210 may connect the first battery 411 to the power node to form an electrical route 1451, connect the second battery 412 to the boost node to form an electrical route 1453, connect the external device 470 to the external charge node, and connect the Nth battery 41N to the open node to form an electrical route 1457. The first power of the first battery 411 may be transmitted to the power management integrated circuit 430 along an electrical route 1452. That is, the processor 210 may drive the electronic device 201 using the first power of the first battery 411. The second electric charge of the second battery 412 may be transferred to the booster circuit 450 along an electrical route 1454. The second power of the second battery 412 having voltage boosted in the booster circuit 450 may be transmitted to the charger IC 440 along an electrical route 1455. The second power passed through the charger IC 440 may be transmitted to the external device 470 along an electrical route 1456.

Figure 15:
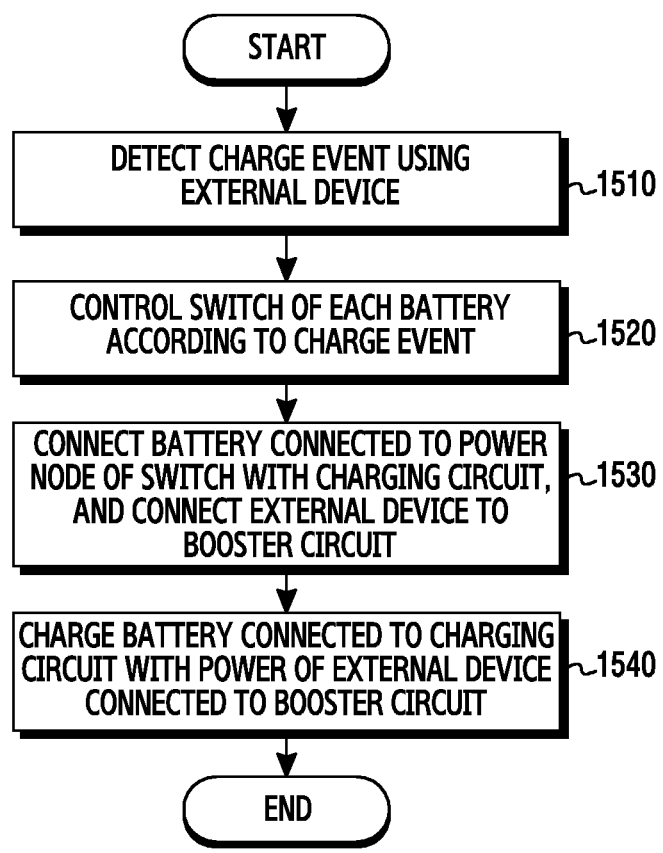
FIG. 15 illustrates a method for controlling a switch of each battery, for charging an electronic device using an external device according to various embodiments.

FIG. 15 illustrates a method for controlling a switch of each battery, for charging an electronic device using an external device according to various embodiments.

Referring to FIG. 15, in operation 1510, the processor 210 may detect an external charge event using the external device 470. For example, the external charge event may be a case where the external device 470 is an electronic device supporting external charging to which the present disclosure is applied. The processor 210 may determine whether the external device 470 is connected to the charger IC 440 so as to detect the external charge event. The processor 210 may determine, periodically or in the real-time, whether the external device 470 is connected to the charger IC 440. Alternatively, when a user request is present, the processor 210 may determine whether the external device 470 is connected to the charger IC 440. For example, the processor 210 may display, on the display 260, a user interface related to battery charging according to a user request, and search for whether the external device 470 is connected when an external charge within the user interface is selected. When the external device 470 is connected, the processor 210 may determine that the external charge event has occurred.

In operation 1520, the processor 210 may control a switch of each of batteries according to the external charge event. The processor 210 may control the first switch 461, the second switch 462, the Nth switch 46N, or the external control switch 471 according to the external charge event. According to various embodiments, the processor 210 may select a battery to be charged using the external device 470, based on battery information measured by the remaining battery charge measurement circuit 420. For example, the processor 210 may select a battery among multiple batteries 411-41N based on the battery information. Alternatively, when the external charge event occurs by a request of a user, the processor 210 may receive, from the user, a selected battery to be charged by the external device 470. The processor 210 may connect a battery among multiple batteries 411-41N to a power node of a switch, connect an external control switch to a boost node, and connect the remaining batteries to an open node of a switch.

TABLE 6

| Switch | SW1 | SW2 | SW3 | ... | SWN | SW_Ext |
|---|---|---|---|---|---|---|
| Case 1 | Vbat | Open | Open | ... | Open | Boost |
| Case 2 | Open | Vbat | Open | ... | Open | Boost |
| Case 3 | Open | Open | Vbat | ... | Open | Boost |
| ... | ... | ... | ... | ... | ... | ... |
| Case N | Open | Open | Open | ... | Vbat | Boost |

Referring to TABLE 6, in case 1, the processor 210 may perform a control such that the first switch (SW1) 461 is connected to the power node, the external control switch (SW_Ext) 471 is connected to the boost node, and the second switch (SW2) 462 and the Nth switch (SW3) 46N is connected to the open node (Open). Alternatively, in case 2, the processor 210 may perform a control such that the first switch 461 and the Nth switch 47N are connected to the open node, the second switch 462 is connected to the power node, and the external control switch 471 is connected to the boost node. Alternatively, in case 3, the processor 210 may perform a control such that the first switch 461 and the second switch 462 are connected to the open node, the Nth switch (SW3) 46N is connected to the power node, and the external control switch 471 is connected to the boost node.

According to various embodiments, like the preceding, the processor 210 may select two or more batteries among multiple batteries 411-41N even when the electronic device 201 is charged using an external device. Alternatively, when the battery external charge event occurs by a user request, the processor 210 may receive two or more selected batteries to be charged from the user. In this case, when two batteries connected to the power node from the external device 470 are charged, the processor 210 may use an equal amount of power for charging, or set a priority order to sequentially charge two batteries.

According to various embodiments, the processor 210 may charge all of multiple batteries 411-41N even when the electronic device 201 is charged using the external device 470. In this case, the processor 210 may use an equal amount of power to charge the power of batteries 411-41N connected to the power node from the external device 470, or set a priority order to sequentially charge the batteries. For example, the processor 210 may: charge the first battery 411 first, using the external device 470; charge the second battery 412 using the external device 470 when the first battery 411 is completely charged; and charge the Nth battery 41N using the external device 470 when the second battery 412 is completely charged. The meaning of "completely charged" may be that the charging capacity of the first battery 411 is full (100%) or may be that a predetermined charging capacity (e.g., 50%) is determined to be satisfied.

In operation 1530, the processor 210 may electrically connect the external device 470 connected to the boost node of the external control switch 471 with the booster circuit 450 and the charger IC 440, and electrically connect the battery connected to the power node of the switch with the power management integrated circuit 430 and the charger IC 440. For example, the processor 210 may connect the external device 470 connected to the boost node with the booster circuit 450 and the charger IC 440, and connect the first battery 411 connected to the power node with the power management integrated circuit 430 and the charger IC 440. Alternatively, the processor 210 may connect the external device 470 connected to the boost node with the booster circuit 450 and the charger IC 440, and connect the second battery 412 connected to the power node with the power management integrated circuit 430 and the charger IC 440. Alternatively, the processor 210 may connect the external device 470 connected to the boost node with the booster circuit 450 and the charger IC 440, and connect the nth battery 41N connected to the power node with the power management integrated circuit 430 and the charger IC 440.

In operation 1540, the processor 210 may charge the battery connected to the power management integrated circuit 430 and the charger IC 440, using power of the external device 470 connected to the booster circuit 450. Referring to TABLE 6, the processor 210 may boost voltage of the external device 470 connected to the booster circuit 450, and transmit, through the charger IC 440, the boosted voltage to the first battery 411 connected to the power management integrated circuit 430. The processor 210 may boost voltage of the external device 470 connected to the booster circuit 450, and transmit, through the charger IC 440, to the second battery 412 connected to the power management integrated circuit 430. The processor 210 may boost voltage of the external device 470 connected to the booster circuit 450, and transmit, through the charger IC 440, to the Nth battery 41N connected to the power management integrated circuit 430.

Figure 16A:
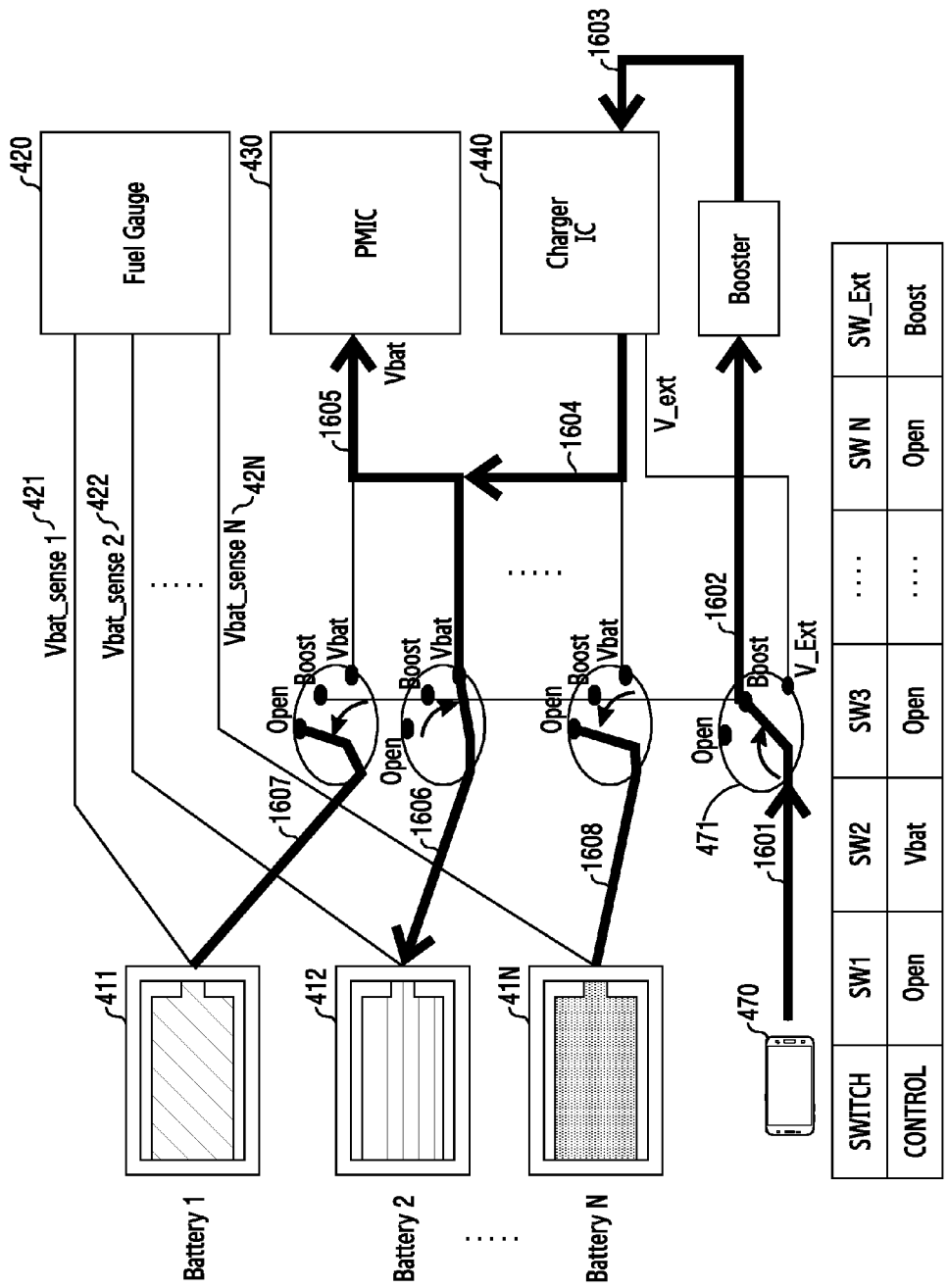
FIG. 16A and FIG. 16B illustrate examples of controlling a switch of each battery, for charging an electronic device using an external device according to various embodiments.
Figure 16B:
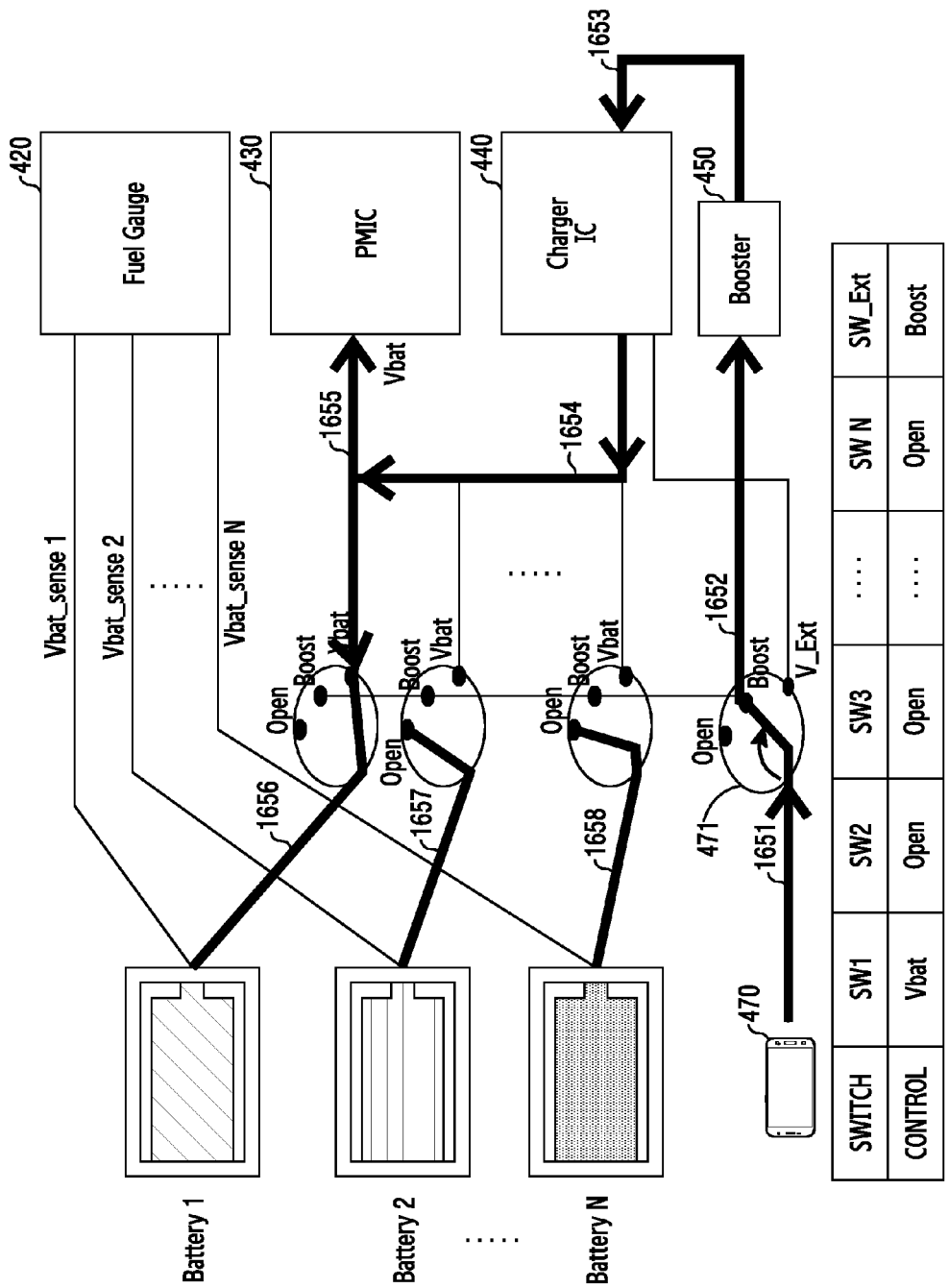

FIG. 16A and FIG. 16B illustrate examples of controlling a switch of each battery, for charging an electronic device using an external device according to various embodiments.

FIG. 16A illustrates an example of charging the second battery 412 with power of the external device 470, and using the same as a main power of the electronic device 201. Referring to FIG. 16A and TABLE 6 (case 2), the processor 210 may connect the external device 470 to the boost node to form an electrical route 1601, connect the second battery 412 to the power node to form an electrical route 1606, connect the first battery 411 to the open node to form an electrical route 1607, and connect the Nth battery 41N to the open node to form an electrical route 1608. An electric charge of the external device 470 may be transferred to the booster circuit 450 along an electrical route 1602. The power of the external device 470 having voltage boosted in the booster circuit 450 may be transmitted to the charger IC 440 along an electrical route 1603. In the charger IC 440, the voltage-boosted power may be transmitted to the second battery 412 along an electrical route 1604 and used as a main power. That is, the second battery 412 may receive power from the charger IC 440 through the electrical route 1606. The power management integrated circuit 430 may receive power from the charger IC 440 through an electrical route 1605.

FIG. 16B illustrates an example of charging the first battery 411 with power of the external device 470, and using the same as a main power of the electronic device 201. Referring to FIG. 16B and TABLE 6 (case 1), the processor 210 may connect the external device 470 to the boost node to form an electrical route 1651, connect the first battery 411 to the power node to form an electrical route 1656, connect the second battery 412 to the open node to form an electrical route 1657, and connect the Nth battery 41N to the open node to form an electrical route 1658. An electric charge of the external device 470 may be transferred to the booster circuit 450 along an electrical route 1652. The power of the external device 470 having voltage boosted in the booster circuit 450 may be transmitted to the charger IC 440 along an electrical route 1653. In the charger IC 440, the voltage-boosted power may be transmitted to the first battery 411 along an electrical route 1654. That is, the first battery 411 may receive power from the charger IC 440 through an electrical route 1656. The power management integrated circuit 430 may receive power from the charger IC 440 through an electrical route 1655.

FIGS. 17A-17D illustrate user interfaces related to an electric charge transfer of a battery according to various embodiments.

Figure 17A:
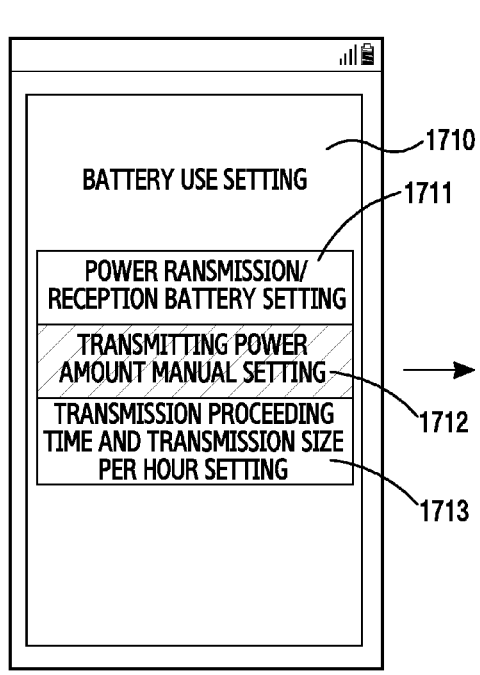
FIGS. 17A-17D illustrate user interfaces related to an electric charge transfer of a battery according to various embodiments.

FIG. 17A illustrates a user interface 1710 related to a battery use setting. The processor 210 may display, on the display 260, the user interface 1710 related to a battery use setting according to a user request. For example, the user request may be for executing an application associated with a battery manager or selecting a battery management in the setting menu of the electronic device 201. The user interface 1710 may include a menu for a power transmission/reception battery setting 1711, a power transmission amount manual setting 1712, and a transmission proceeding time and transmission size per hour setting 1713.

Figure 17B:
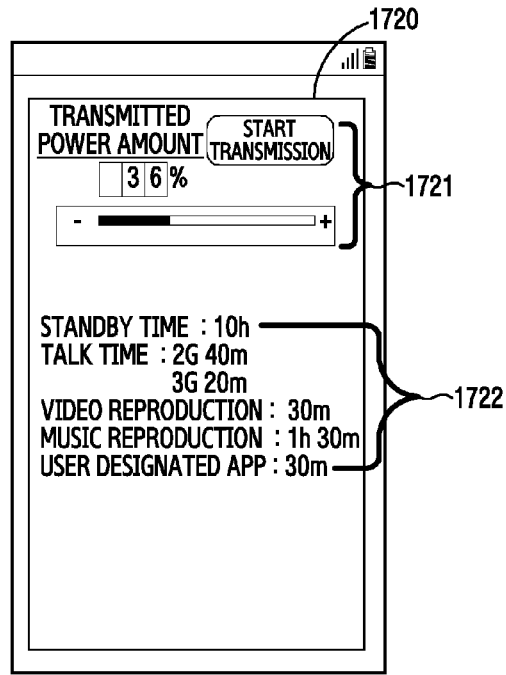

FIG. 17B illustrates a screen provided when the power transmission amount manual setting 1712 is selected in the user interface 1710. The processor 210 may display the user interface 1720 including power transmission amount information 1721 and application information 1722. A user may manually input a number for the amount of power transmission, or change the amount of power transmission through a control bar, in the power transmission amount information 1721. The application information 1722 is information indicating by calculating the degree of possibility for driving each function, using the power transmission amount. For example, the application information 1722 may include a standby time (10H), a talk time (2G: 40M, 3G: 20M), video reproduction (30M), music reproduction (1H 30M), and a user designated application (30M). Here, H means hours, and M means minutes.

Figure 17C:
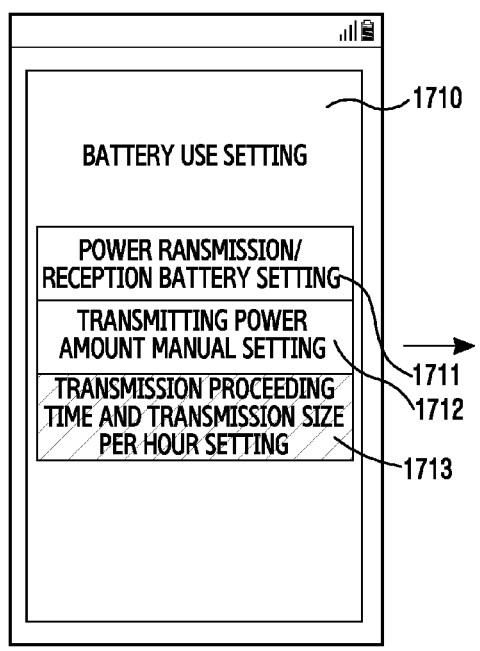

FIG. 17C illustrates an example of a selection indicator located in the menu associated with the transmission proceeding time and transmission size per hour setting 1713 in the user interface 1710. The meaning of "a selection indicator is located" is that the user has selected the transmission proceeding time and transmission size per hour setting 1713 in the user interface 1710.

Figure 17D:
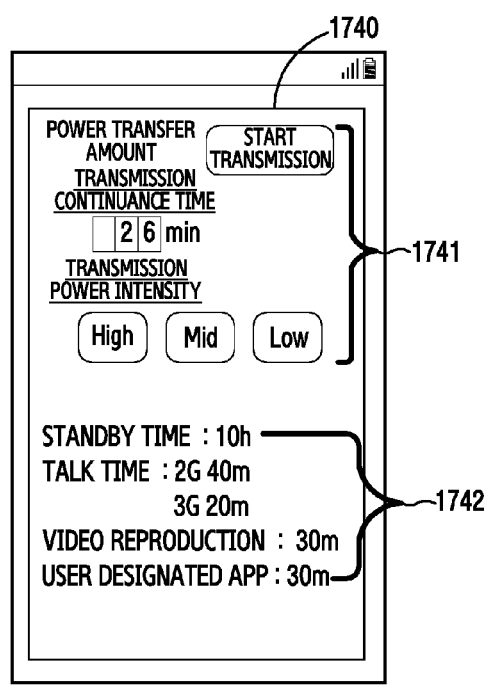

FIG. 17D illustrates a screen provided when the transmission proceeding time and transmission size per hour setting 1713 is selected. The processor 210 may display the user interface 1740 including power transfer amount information 1741 and application information 1742. A user may select a transmission continuance time (26 mins) and a transmission intensity (high, mid, low), in the power transfer amount information 1741. The application information 1742 may indicate the amount of change for each application according to a setting of the transmission continuance time and the transmission intensity.

An operation method of an electronic device including a first battery, a second battery, a power management integrated circuit (PMIC), a charger IC, a booster circuit, and an open circuit, according to various embodiments may include: an operation for detecting a battery control event; an operation for controlling a first switch electrically connected to the first by and a second switch electrically connected to the second battery, according to the battery control event; and an operation for electrically connecting the first battery and the second battery to at least one of the PMIC, the charger IC, the booster circuit, and the open circuit by controlling the first switch and the second switch.

The operation for detecting may include an operation for detecting information of the first battery or information of the second battery, using a remaining battery charge measurement circuit included in the electronic device, and an operation for generating the battery control event based on information of the first battery or information of the second battery.

The operation for detecting may include an operation for displaying a user interface associated with a battery control according to a user request, an operation for receiving a user input through the user interface, and an operation for determining that the battery control event has occurred when the user input is received.

The operation for controlling the first switch and the second switch may include an operation of: controlling the first switch such that the first battery is connected to at least one of a power node, boost node, and open node of the first switch; and controlling the second switch such that the second battery is connected to at least one of a power node, boost node, and open node of the second switch.

The operation for connecting the first battery and the second battery may include an operation of: connecting the first battery to the PMIC and the charger IC; and driving the electronic device using a first power of the first battery when the second battery is connected to the open circuit.

The operation for connecting the first battery and the second battery may include an operation of: connecting the first battery to the open circuit; and driving the electronic device using a second power of the second battery when the second battery is connected to the PMIC and the charger IC.

The operation for connecting the first battery and the second battery may include an operation of: connecting the first battery to the PMIC and the charger IC; and boosting, using the booster circuit, a second voltage of the second battery and charging the first power of the first battery when the second battery is connected to the booster circuit.

The operation for connecting the first battery and the second battery may further include an operation of: connecting the first battery to the booster circuit and the charger IC; and boosting, using the booster circuit, a first voltage of the first battery and charging the second power of the second battery when the second battery is connected to the PMIC and the charger IC.

The operation method may further include the operations of: determining whether the external device is connected; when the external device is connected, controlling an external control switch connected to the external device to make a connection to the booster circuit and the charger IC, and controlling the first switch to connect the first battery to the PMIC and the charger IC; and boosting, using the booster circuit, voltage of the external device and charging the first power of the first battery.

The operation method may further include the operations of: determining whether the external device is connected; when the external device is connected, controlling an external control switch connected to the external device to make a connection to the booster circuit and the charger IC, and controlling the second switch to connect the second battery to the PMIC and the charger IC; and boosting, using the booster circuit, voltage of the external device and charging the second power of the second battery.

The operation method may further include the operations of: determining whether the external device is connected; when the external device is connected, controlling an external control switch connected to the external device to make a connection to the charger IC, controlling the first switch to connect the first battery to the PMIC and the charger IC, and controlling the second switch to connect the second battery to the booster circuit and the charger IC; and transmitting the first power generated by the first battery to the PMIC, and boosting, using the booster circuit, voltage of the second power of the second battery and transmitting the same to the external device.

The operation method may further include the operations of: determining whether the external device is connected; when the external device is connected, controlling an external control switch connected to the external device to make a connection to the charger IC, controlling the first switch to connect the first battery to the booster circuit, and controlling the second switch to connect the second battery too the PMIC and the charger IC; and boosting, using the booster circuit, the first voltage of the first battery and transmitting the same to the external device through the charger IC, and transmitting the second power generated by the second battery to the PMIC.

Figure 18:
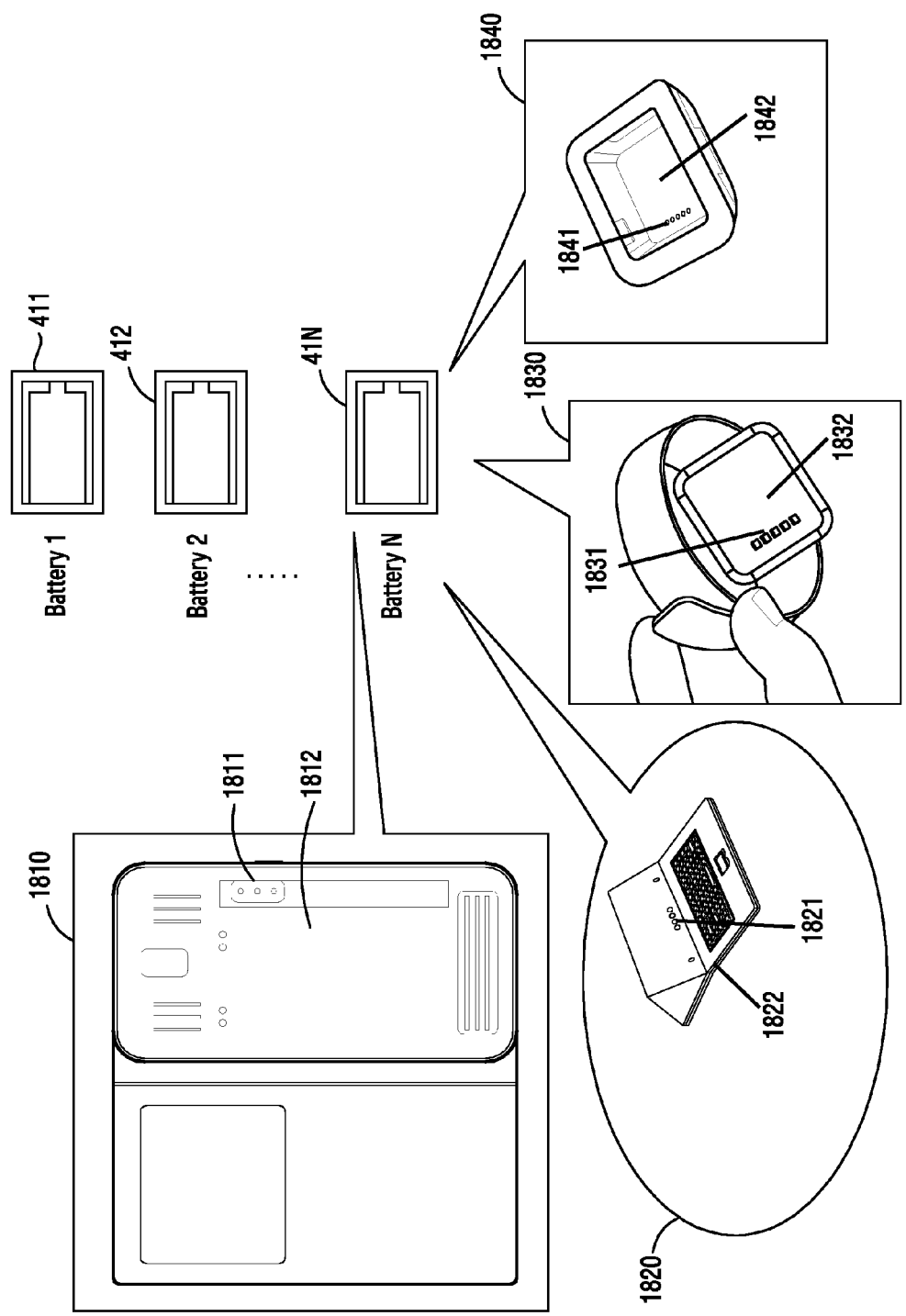
FIG. 18 illustrates an example of connecting an external battery to an electronic device according to various embodiments.

FIG. 18 illustrates an example of connecting an external battery to an electronic device according to various embodiments.

Referring to FIG. 18, the Nth battery 41N may be utilized for various methods according to various types of electronic devices. For example, reference numeral 1810 illustrates an example in which the Nth battery 41N is connected to a smart phone through a pogo pin 1811 and mounted on a surface 1812 of the smart phone. Reference numeral 1820 illustrates an example in which the Nth battery is included 1822 in a form of a keyboard and connected to a tablet through a pogo pin 1821. Reference numeral 1830 illustrates an example in which the Nth battery 41N is included 1832 in a wearable device (e.g., a watch type) and connected through a pogo pin 1831 on the back surface. Reference numeral 1840 illustrates an example in which the Nth battery 41N is attached to a wearable device in an accessary form 1842 through a pogo pin 1841.

Figure 19:
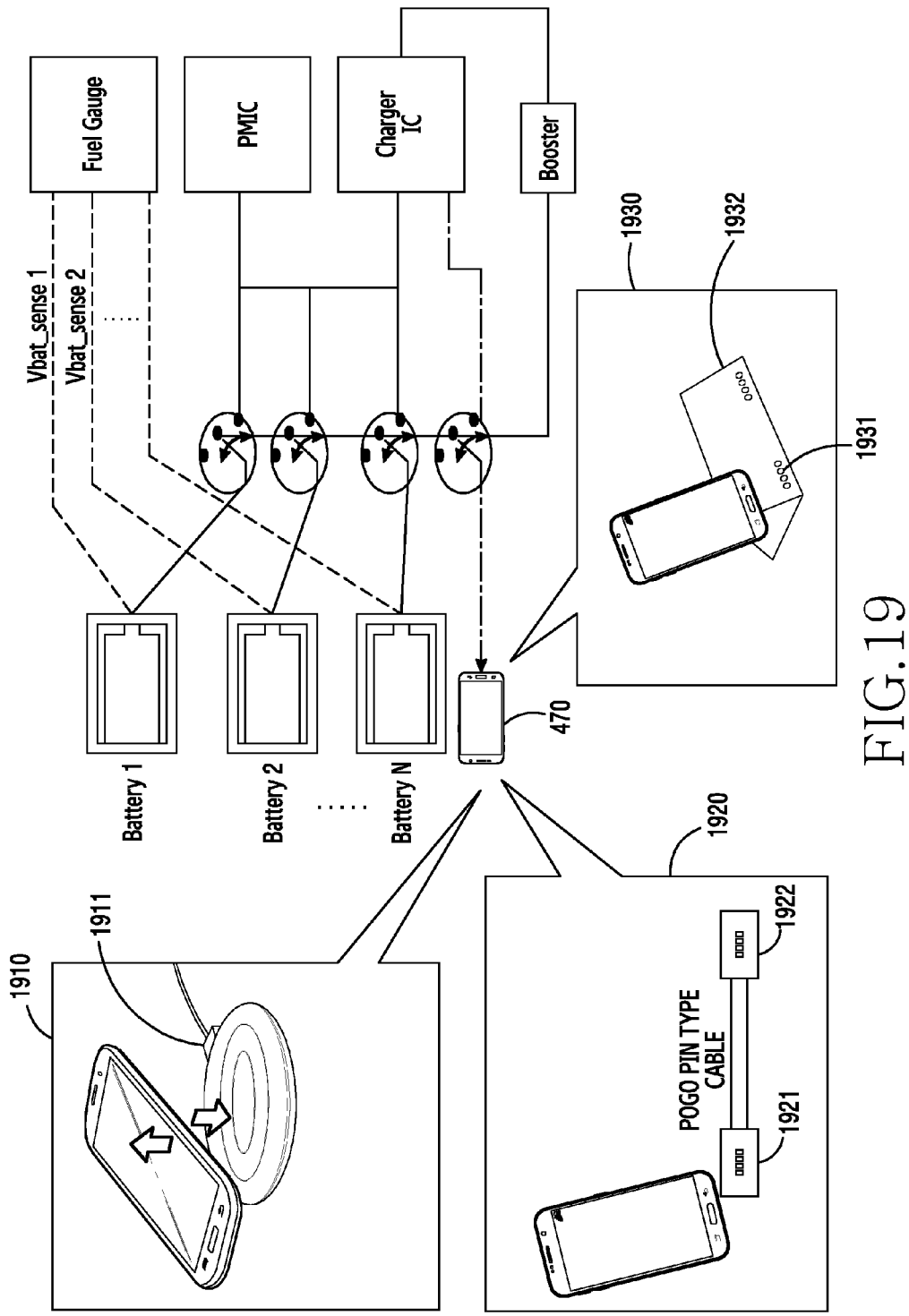
FIG. 19 illustrates an example related to charging an external device according to various embodiments.

FIG. 19 illustrates an example related to charging an external device according to various embodiments.

Referring to FIG. 19, an example of charging the external device 470 (e.g., a smart phone) through various connection mediums is illustrated. Reference numeral 1910 illustrates an example in which the electronic device 201 is connected to a wireless charging device through a wire type pogo pin 18911, and providing wireless charging to a smart phone. Reference numeral 1920 illustrates an example in which pogo pins are connected to each other by a cable such that a smart phone is connected to a pogo pin 1921 and the electronic device 201 is also connected to a pogo pin 1922 to charge the smart phone. Reference numeral 1930 illustrates an example of connecting the electronic device 201 and a smart phone through a cradle 1932 and charging the smart phone connected to a pogo pin 1931.

FIGS. 20A-20D illustrate examples related to an external battery according to various embodiments.

Referring to FIG. 20A, an example of connecting an accessary type external battery 2012 to a wearable device even when a battery 2011 mounted in the wearable device is empty is illustrated. Referring to FIG. 20B, an example of charging a battery of a wearable device 2021 from an external battery 2022 is illustrated. Referring to FIG. 20C, an example of removing an external battery 2032 after charging a battery of a wearable device 2031 from the external battery 2032 is illustrated. By referring to FIGS. 20A-20C, it may be perceived that a wearable device is not required to continuously have an external battery in order to be supplied with power.

Referring to FIG. 20D, an application example of mounting a first external battery 2041 in a body of a wearable device, and mounting a second external battery 2042 and a third external battery 2043 in a band of the wearable device is illustrated.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

Although the present disclosure has been described with an exemplary embodiment, various changes and modifications may be suggested to one skilled in the art. It is intended that the present disclosure encompass such changes and modifications as fall within the scope of the appended claims.

What is claimed is:
1. An electronic device comprising:
 a housing comprising:
  a first battery;
  a second battery;
  a power management integrated circuit (PMIC);
  a battery charging circuit;
  a booster circuit;
  a first switch electrically connected with the first battery;
  a second switch electrically connected with the second battery; and
  a control circuit,
 wherein the first switch and the second switch are three-point switches having an open node, a boost node and a power node (Vbat node), in which the open node is a node in which no electrical route is formed with any circuit, the boost node is a node connected to the booster circuit and an input of the battery charging circuit, and the power node is a node connected the PMIC and an output of the battery charging circuit, and
 wherein the control circuit is configured to provide, at least using the first switch and the second switch one of:
  a first state in which the first battery is electrically connected with the PMIC and an output of the battery charging circuit when the second battery forms an open circuit, and in which the first battery is used as a main power source for the electronic device,
  a second state in which the first battery is electrically connected with the booster circuit and an input of the battery charging circuit, in which the second battery is connected to the output of the battery charging circuit, and in which the first battery is used as a main power source for the electronic device;

a fourth state in which the second battery is electrically connected with the PMIC and the output of the battery charging circuit when the first battery forms an open circuit, and in which the second battery is used as a main power source for the electronic device, and a fifth state in which the second battery is electrically connected with the booster circuit and in input of the battery charging circuit, in which the first battery is connected to the output of the battery charging circuitry, and in which the second battery is used as a main power source for the electronic device.

2. The electronic device of claim 1, wherein the control circuit is configured to control the first switch and the second switch such that the second state and the fourth state are provided.

3. The electronic device of claim 1, wherein the control circuit is configured to control the first switch and the second switch such that the first state and the fifth state are provided.

4. The electronic device of claim 1, further comprising a remaining battery charge measurement circuit electrically connected with the first battery and the second battery, and configured to generate a signal based on the remaining battery charge of each of the batteries, wherein the control circuit is configured to control, based on at least a part of the signal, at least one of the first switch or the second switch such that at least one of the first state, the second state, the fourth state, and the fifth state, is provided.

5. The electronic device of claim 1, wherein the housing further comprises:

a third battery; and a third switch electrically connected with the third battery, wherein the control circuit is configured to select, at least using the third switch, one of:

a seventh state in which the third battery is electrically connected with the PMIC and the output of the battery charging circuit, an eighth state in which the third battery is electrically connected with the booster circuit and the input of the battery charging circuit, and a ninth state in which the third battery forms an open circuit.

6. The electronic device of claim 5, wherein the control circuit is configured to control the first switch, the second switch, and the third switch such that the second state, the fourth state, and the ninth state are provided.

7. The electronic device of claim 1, wherein the control circuit is configured to:

control the first switch such that the first battery is connected to the booster circuit; and change a first voltage generated by power of the first battery to a second voltage that is higher than the first voltage.

8. The electronic device of claim 7, wherein the control circuit is configured to charge the second battery using power based on the second voltage.

9. The electronic device of claim 1, wherein the control circuit is configured to connect, by the first switch, the first battery to the open circuit to disable the first battery.

10. The electronic device of claim 1, wherein the first battery and the second battery are arranged to be spaced apart, each of the first battery and the second battery includes an anode and a cathode.

11. The electronic device of claim 1, wherein the first battery or the second battery are removable from the electronic device.

12. An electronic device comprising:

a housing comprising:

a first battery;

a second battery;

a power management integrated circuit (PMIC);

a battery charging circuit;

a booster circuit;

a remaining battery charge measurement circuit electrically connected with the first battery and the second battery and configured to generate a signal based on a remaining battery charge of each of the first and the second battery; and a control circuit, wherein the first switch and the second switch are three-point switches having an open node, a boost node and a power node (Vbat node), in which the open node is a node in which no electrical route is formed with any circuit, the boost node is a node connected to the booster circuit and an input of the battery charging circuit, and the power node is a node connected the PMIC and an output of the battery charging circuit, wherein the control circuit is configured to provide one of:

a first state in which the first battery is electrically connected with the PMIC and an output of the battery charging circuit when the second battery forms an open circuit, and in which the first battery is used as a main power source for the electronic device, a second state in which the first battery is electrically connected with the booster circuit and an input of the battery charging circuit, in which the second battery is connected to the output of the battery charging circuit, and in which the first battery is used as a main power source for the electronic device, a fourth state in which the second battery is electrically connected with the PMIC and the output of the battery charging circuit when the first battery forms an open circuit, and in which the second battery is used as a main power source for the electronic device, and a fifth state in which the second battery is electrically connected with the booster circuit and the input of the battery charging circuit, in which the first battery is connected to the output of the battery charging circuit, and in which the second battery is used as a main power source for the electronic device.

13. The electronic device of claim 12, further comprising:

the first switch electrically connected with the first battery; and the second switch electrically connected with the second battery, wherein the control circuit is configured to control, based on at least a part of the signal, at least one of the first switch or the second switch such that at least one of the first state, the second state, the fourth state, and the fifth state, is provided.

14. The electronic device of claim 12, wherein the control circuit is configured to:

connect the first battery to the booster circuit and the input of the battery charging circuit;

connect the second battery to the PMIC and the output of the battery charging circuit; and change a first voltage generated by power of the first battery to a second voltage that is higher than the first voltage, and charge the second battery using power based on the second voltage.

15. A method of operating an electronic device comprising a first battery, a second battery, a power management integrated circuit (PMIC), a battery charging circuit, a booster circuit, and an open circuit, the method comprising:
  detecting a battery control event; and
  controlling a first switch electrically connected to the first battery and a second switch electrically connected to the second battery according to the battery control event, wherein the first switch and the second switch are three-point switches having an open node, a boost node and a power node (Vbat node), in which the open node is a node in which no electrical route is formed with any circuit, the boost node is a node connected to the booster circuit and an input of the battery charging circuit, and the power node is a node connected the PMIC and an output of the battery charging circuit, and wherein the controlling provides one of:
    a first state in which the first battery is electrically connected with the PMIC and an output of the battery charging circuit when the second battery forms an open circuit, and in which the first battery is used as a main power source for the electronic device,
    a second state in which the first battery is electrically connected with the booster circuit and an input of the battery charging circuit, in which the second battery is connected to the output of the battery charging circuit, and in which the first battery is used as a main power source for the electronic device,
    a fourth state in which the second battery is electrically connected with the PMIC and the output of the battery charging circuit when the first battery forms an open circuit, and in which the second battery is used as a main power source for the electronic device, and
    a fifth state in which the second battery is electrically connected with the booster circuit and the input of the battery charging circuit, in which the first battery is connected to the output of the battery charging circuit, and in which the second battery is used as a main power source for the electronic device.

16. The method of claim 15, wherein the detecting comprises:
  detecting information of the first battery or information of the second battery using a remaining battery charge measurement circuit included in the electronic device; and
  generating the battery control event based on information of the first battery or information of the second battery.

17. The method of claim 15, wherein the detecting comprises:
  displaying a user interface associated with a battery control according to a user request;
  receiving a user input through the user interface; and
  determining that the battery control event has occurred when the user input is received.

* * * * *